United States Patent
Matsushita et al.

(10) Patent No.: US 9,494,927 B2
(45) Date of Patent: Nov. 15, 2016

(54) MOTOR CONTROL DEVICE AND GAME MACHINE

(71) Applicant: OMRON Corporation, Kyoto-shi, Kyoto (JP)

(72) Inventors: Katsumi Matsushita, Aichi (JP); Yasuyuki Oba, Aichi (JP); Hiroyuki Ibuki, Aichi (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/427,375

(22) PCT Filed: Aug. 26, 2013

(86) PCT No.: PCT/JP2013/072758
§ 371 (c)(1),
(2) Date: Mar. 11, 2015

(87) PCT Pub. No.: WO2014/050404
PCT Pub. Date: Apr. 3, 2014

(65) Prior Publication Data
US 2015/0227125 A1     Aug. 13, 2015

(30) Foreign Application Priority Data
Sep. 28, 2012   (JP) ................ 2012-218696

(51) Int. Cl.
*G05B 19/40*     (2006.01)
*G05B 15/02*     (2006.01)
(Continued)

(52) U.S. Cl.
CPC ............... *G05B 15/02* (2013.01); *A63F 9/24* (2013.01); *G05B 19/19* (2013.01); *H02P 7/18* (2013.01);
(Continued)

(58) Field of Classification Search
CPC ............ G05B 19/40; H02P 8/14; H02P 8/34
USPC .................. 318/696, 685, 599, 811, 400.01
See application file for complete search history.

(56) References Cited

U.S. PATENT DOCUMENTS

| 6,375,192 | B1 * | 4/2002 | Uchiyama | ................. A63F 9/02 273/331 |
| 6,712,694 | B1 * | 3/2004 | Nordman | ................. G07F 17/32 273/138.2 |
| 7,278,638 | B2 * | 10/2007 | Nordman | ............ G07F 17/3211 273/292 |

(Continued)

FOREIGN PATENT DOCUMENTS

JP        2009-247833 A     10/2009

OTHER PUBLICATIONS

International Search Report issued in correspondence application No. PCT/JP2013/072758, mailed Oct. 15, 2013 (3 pages).

*Primary Examiner* — Rina Duda
(74) *Attorney, Agent, or Firm* — Osha Liang LLP

(57) ABSTRACT

A motor control device has a communication unit that receives a control command comprising a motor type identification signal and a rotation signal, wherein the motor type identification signal indicates whether a control object motor is a stepping motor or a DC motor, and wherein the rotation signal designates a target rotation amount and a target rotation speed of the motor, a sensor interface that receives a detection signal from a rotation angle sensor when the control object motor is the DC motor, wherein the rotation angle sensor outputs the detection signal every time the motor rotates by a first rotation angle, a DC motor drive signal generator that generates and outputs a first drive signal rotating the DC motor at the target rotation speed, and a stepping motor drive signal generator that generates and outputs a second drive signal rotating the stepping motor at the target rotation speed.

8 Claims, 17 Drawing Sheets

(51) Int. Cl.
    *H02P 29/00* (2016.01)
    *H02P 7/28* (2016.01)
    *H02P 8/14* (2006.01)
    *A63F 9/24* (2006.01)
    *H02P 7/18* (2006.01)
    *G05B 19/19* (2006.01)

(52) U.S. Cl.
    CPC ............... *H02P 7/2805* (2013.01); *H02P 8/14* (2013.01); *H02P 29/00* (2013.01); *A63F 2009/2447* (2013.01); *A63F 2009/2482* (2013.01); *G05B 2219/33114* (2013.01)

(56) References Cited

U.S. PATENT DOCUMENTS

| | | | | |
|---|---|---|---|---|
| 7,438,641 | B2* | 10/2008 | Hedrick | G07F 17/3211 463/16 |
| 7,583,038 | B2* | 9/2009 | Aizawa | B41J 29/38 318/34 |
| 8,378,616 | B2* | 2/2013 | Sun | H02N 2/0075 318/116 |
| 2009/0239645 | A1* | 9/2009 | Fujimori | G07F 17/32 463/20 |
| 2011/0118013 | A1* | 5/2011 | Mattice | G07F 17/3202 463/30 |

* cited by examiner

| Operation | TR1 | TR2 | TR3 | TR4 |
|---|---|---|---|---|
| Normal rotation, Drive | ON | OFF | OFF | ON |
| Normal rotation, Stand still | OFF | OFF | OFF | OFF |
| Reverse rotation, Drive | OFF | ON | ON | OFF |
| Reverse rotation, Stand still | OFF | OFF | OFF | OFF |
| Brake | OFF | OFF | ON | ON |

Speed range '00'                                     701

| Speed data | The number of steps (pps) | Duty ratio (%) |
|---|---|---|
| 0000 | Stopping | Brake |
| 0011 | 550 | 55 |
| 0111 | 700 | 70 |
| 1111 | 1000 | 100 |

Speed range '01'                                     702

| Speed data | The number of steps (pps) | Duty ratio (%) |
|---|---|---|
| 0000 | Stopping | Brake |
| 0011 | 450 | 45 |
| 0111 | 600 | 60 |
| 1111 | 900 | 90 |

Speed range '10'                                     703

| Speed data | The number of steps (pps) | Duty ratio (%) |
|---|---|---|
| 0000 | Stopping | Brake |
| 0011 | 350 | 35 |
| 0111 | 500 | 50 |
| 1111 | 800 | 80 |

Speed range '11'                                     704

| Speed data | The number of steps (pps) | Duty ratio (%) |
|---|---|---|
| 0000 | Stopping | Brake |
| 0011 | 250 | 25 |
| 0111 | 400 | 40 |
| 1111 | 700 | 70 |

MOTOR CONTROL DEVICE AND GAME MACHINE

TECHNICAL FIELD

The present invention relates to a motor control device that can control plural kinds of motors and a game machine including the motor control device.

RELATED ART

In game machines such as a reel type game machine and a pachinko game machine, performance is devised to appeal to a visual sense, a hearing sense, and feeling of a player in order to enhance a player's interest. Particularly, sometimes a movable body, for example, a movable accessory is provided in the game machine in order to appeal to the visual sense of the player. A moving range and a moving speed of the movable body are previously set according to the performance. Therefore, generally a rotation amount per step is fixed, and the movable body is driven by a stepping motor that can control the rotation amount in units of steps. A performance processor unit (hereinafter, simply referred to as a performance CPU) that is an example of a high-order control device transmits a command to rotate the stepping motor by the number of steps corresponding to a moving amount in which the movable body moves a designated position according to a game state, to a control circuit of the stepping motor to rotate the stepping motor by the number of steps, whereby the movable body moves to the designated position (for example, see Japanese Unexamined Patent Publication No. 2009-247833).

SUMMARY

Nowadays, the number of movable bodies mounted on the game machine tends to increase in order to enhance the player's interest. As the number of movable bodies mounted on the game machine increases, the number of motors driving the movable bodies also increases. However, because a space behind a surface of the game machine is restricted, there is a risk of hardly arranging the motors in the game machine as the number of motors increases. Particularly, it is necessary to perform excitation control of plural phases in the stepping motor, the stepping motor has a complicated structure, and therefore the stepping motor is enlarged. The stepping motor is relatively expensive. Therefore, it is undesirable to increase the number of stepping motors.

Sometimes a large-size movable accessory is mounted on the game machine in order to enhance the player's interest. It is necessary to provide a motor having a high torque in order to drive the large-size movable accessory. However, in order to increase the torque of the stepping motor, it is necessary to enlarge the stepping motor. As a result, there is a risk of hardly ensuring an arrangement space.

On the other hand, there is a DC motor as a kind of a generally available motor. The DC motor is not expensive compared with the stepping motor, and the DC motor smaller than the stepping motor can exert the identical torque. However, the rotation amount cannot directly be designated in the DC motor. Therefore, in the game machine, the DC motor is not suitable to drive the movable body in which the moving amount per time is previously fixed. The DC motor differs from the stepping motor in a control method. For this reason, in the performance CPU, it is necessary to prepare a control signal of a command system different from that of a control signal for the stepping motor in order that the DC motor is used as the motor driving the movable body instead of the stepping motor. Therefore, development man-hour of the performance CPU is increased to possibly increase cost of the performance CPU.

One or more embodiments of the present invention is to provides a motor control device for being able to control both the DC motor and the stepping motor using the control signal of the identical command system and a game machine.

A motor control device according to one or more embodiments of the present invention includes: a communication unit configured to receive a control command including a motor type identification signal and a signal, the motor type identification signal indicating whether a control object motor is a stepping motor or a DC motor, the signal designating a target rotation amount and a target rotation speed of the motor; a sensor interface configured to receive a detection signal from a rotation angle sensor when the control object motor is the DC motor, the rotation angle sensor outputting the detection signal every time the motor rotates by a first rotation angle; a DC motor drive signal generator configured to generate and output a first drive signal rotating the DC motor at the target rotation speed; a stepping motor drive signal generator configured to generate and output a second drive signal rotating the stepping motor at the target rotation speed; and a controller configured to refer to the motor type identification signal to determine whether the control object motor is the stepping motor or the DC motor, to calculate a total rotation amount from rotation starting of the control object motor by the number of receiving times of the detection signal when the control object motor is the DC motor, to cause the DC motor drive signal generator to output the first drive signal so as to let the control object motor stand still when the total rotation amount reaches the target rotation amount, and to cause the stepping motor drive signal generator to output the second drive signal so as to rotate the control object motor by the number of stepping motor steps corresponding to the target rotation amount when the control object motor is the stepping motor.

In the motor control device, according to one or more embodiments of the present invention, the target rotation amount is expressed by the number of steps in which a predetermined reference rotation angle is set to one step. In this case, according to one or more embodiments of the present invention, when the control object motor is the DC motor, the controller multiplies the number of steps indicated by the target rotation amount by a ratio of the first rotation angle to the reference rotation angle to obtain the target rotation amount in units of first rotation angles, and compares the target rotation amount in units of first rotation angles to the total rotation amount to determine whether the control object motor is let stand still, and when the control object motor is the stepping motor, the controller multiplies the number of steps indicated by the target rotation amount by a ratio of a rotation angle per one step of the stepping motor to the reference rotation angle to calculate the number of stepping motor steps corresponding to the target rotation amount.

In the motor control device, according to one or more embodiments of the present invention, when the control object motor is the DC motor, the controller fixes a pulse width by referring to a first table indicating a relationship between the target rotation speed and the pulse width per period, the pulse width being used to control a current supplied to the DC motor by a pulse width modulation system, and causes the DC motor drive signal generator to generate the first drive signal by notifying the DC motor drive signal generator of the pulse width, and when the control object motor is the stepping motor, the controller fixes the number of steps of the stepping motor per predetermined duration by referring to a second table indicating a relationship between the target rotation speed and the number of steps of the stepping motor per predetermined time, and causes the stepping motor drive signal generator to generate the second drive signal by notifying the stepping motor drive signal generator of the number of steps.

In the motor control device, according to one or more embodiments of the present invention, the control command further includes a speed range designation signal designating one of partial ranges in a rotation speed range that can be set with respect to the control object motor, the first table is set in each of the partial ranges. In this case, according to one or more embodiments of the present invention, when the control object motor is the DC motor, the controller selects the first table corresponding to the partial ranges designated by the speed range designation signal, and the pulse width is fixed using the selected first table.

In the motor control device according to one or more embodiments of the present invention, the control object motor is the DC motor, the first table is set in each of the plural partial ranges different from each other in the rotation speed range that can be set with respect to the control object motor. In this case, according to one or more embodiments of the present invention, the controller measures an actual rotation speed of the control object motor from a time interval of the detection signal received from the rotation angle sensor, selects one of the plural first tables such that a difference between the target rotation speed and the actual rotation speed is decreased, and fixes the pulse width using the selected first table.

In the motor control device according to one or more embodiments of the present invention, the control command further includes a speed designation method signal designating whether the first table is selected according to the speed range designation signal. In this case, according to one or more embodiments of the present invention, when the control object motor is the DC motor, and when the speed designation method signal indicates that the first table is selected irrespective of the speed range designation signal, the controller measures an actual rotation speed of the control object motor from a time interval of the detection signal received from the rotation angle sensor, selects one of the plural first tables such that a difference between the target rotation speed and the actual rotation speed is decreased, and fixes the pulse width using the selected first table.

One or more embodiments of the present invention provides a game machine including: a game machine body; a movable body that is movably arranged in a front surface of the game machine body; a motor configured to drive the movable body; a motor control device configured to control the motor; and a performance controller configured to control performance according to a game state. In the game machine, the performance controller generates a control command and transmits the control command to the motor control device, the control command including a motor type identification signal indicating a type of the motor and a signal designating a target rotation amount of the motor corresponding to a moving distance from a present position of the movable body to a moving destination and a target rotation speed of the motor according to the game state, On the other hand, the motor control device includes: a communication unit configured to receive the control command; a sensor interface configured to receive a detection signal from a rotation angle sensor when the motor is a DC motor, the rotation angle sensor outputting the detection signal every time the motor rotates by a first rotation angle; a DC motor drive signal generator configured to generate and output a first drive signal rotating the DC motor at the target rotation speed; a stepping motor drive signal generator configured to generate and output a second drive signal rotating a stepping motor at the target rotation speed; and a controller configured to refer to the motor type identification signal to determine whether the motor driving the movable body is the stepping motor or the DC motor, to calculate a total rotation amount from rotation starting of the motor by the number of receiving times of the detection signal when the motor is the DC motor, to cause the DC motor drive signal generator to output the first drive signal so as to let the motor stand still when the total rotation amount reaches the target rotation amount, and to cause the stepping motor drive signal generator to output the second drive signal so as to rotate the motor by the number of stepping motor steps corresponding to the target rotation amount when the motor is the stepping motor.

The motor control device and game machine according to one or more embodiments of the present invention may be able to control both the DC motor and the stepping motor using the control signal of the identical command system.

BRIEF DESCRIPTION OF THE DRAWINGS

FIG. 7 is a view illustrating an example of a speed table in each speed range.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In order to be able to control both a DC motor and a stepping motor, the motor control device includes a DC motor drive signal generation unit that generates and outputs a drive signal for the DC motor by a Pulse Width Modulation (PWM) system and a stepping motor drive signal generation unit that generates and outputs a drive signal for the stepping motor. The motor control device determines whether the control object motor is the DC motor or the stepping motor by referring to control object motor identification information included in a control command. The motor control device can control both the DC motor and the stepping motor by fixing a pulse width and the like of the drive signal for the DC motor or stepping motor from values, which are included in the control command to indicate a motor rotation speed and a rotation amount, according to a determination result.

Figure 1:
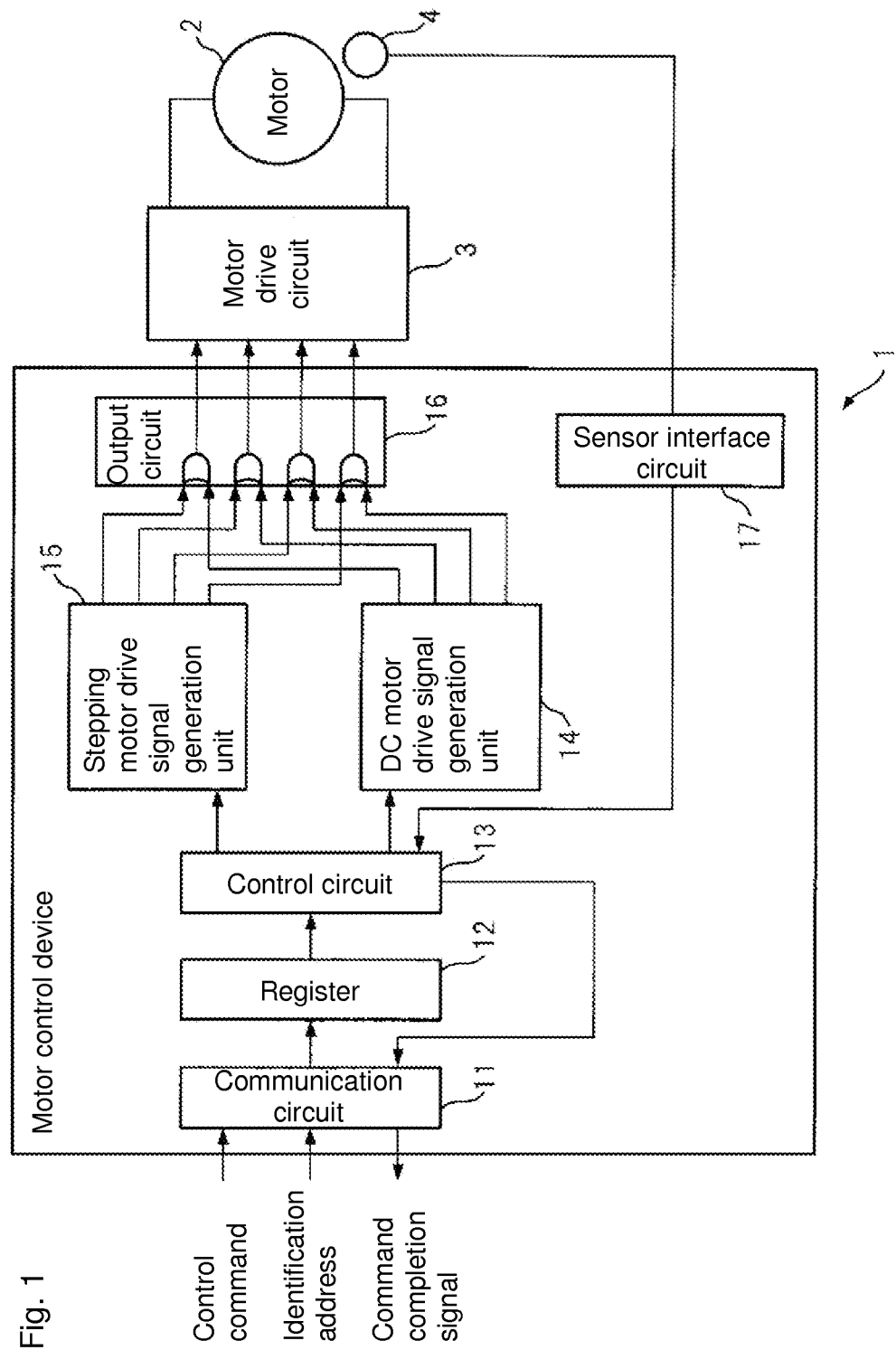
FIG. 1 is a schematic configuration diagram illustrating a motor control device according to one or more embodiments of the present invention.

FIG. 1 is a schematic configuration diagram illustrating the motor control device of one or more embodiments of the present invention. As illustrated in FIG. 1, a motor control device 1 includes a communication circuit 11, a register 12, a control circuit 13, a DC motor drive signal generation unit 14, a stepping motor drive signal generation unit 15, an output circuit 16, and a sensor interface circuit 17.

Each unit included in the motor control device 1 may be mounted on a circuit board (not illustrated) as an individual circuit, or mounted on the circuit board as an integrated circuit.

According to the control command received from a high-order control device, the motor control device 1 controls a control object motor 2 by outputting a pulsed drive signal to a motor drive circuit 3. The pulsed drive signal switches a current supplied to any coil of the motor 2. The motor drive circuit 3 supplies the current to the motor 2.

In the case that the control object motor 2 is the DC motor, the motor control device 1 controls the current supplied to the motor 2 by the PWM system in order to rotate the motor 2 at a target rotation speed designated by the control command. Therefore, the motor control device 1 changes a pulse width per period of the drive signal according to the target rotation speed.

In order to rotate the motor 2 by a target rotation amount, the motor control device 1 receives a detection signal indicating that a rotation shaft (not illustrated) of the motor 2 rotates by a predetermined angle from a rotary encoder 4 every time the rotation shaft rotates by the predetermined angle, and calculates a total rotation amount from starting of the rotation. The motor control device 1 properly decelerates the motor 2 from the target rotation speed designated by the control command according to a difference from the total rotation amount, and lets the motor 2 stand still when the motor 2 rotates by the target rotation amount.

Figures 2, 3:
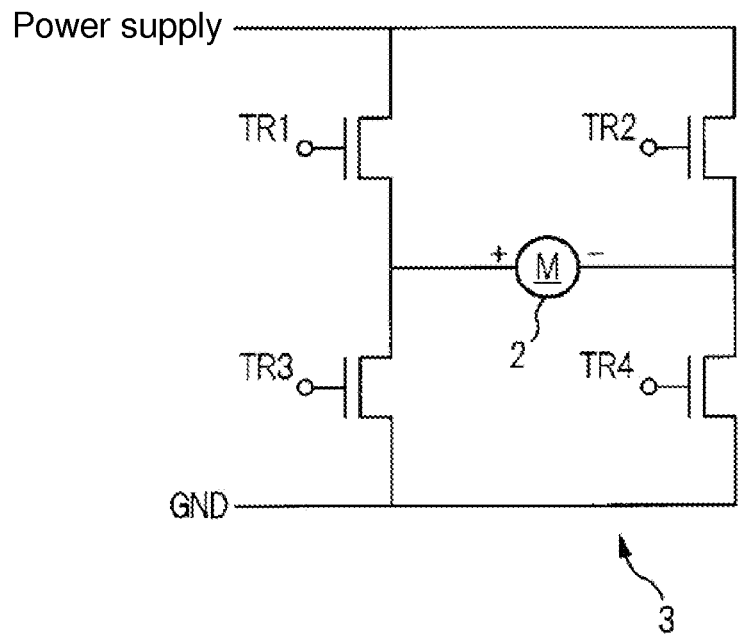
FIG. 2 is a circuit diagram illustrating a motor drive circuit that drives a DC motor.
FIG. 3 is a view illustrating an example of a table indicating a relationship between a drive signal applied to each switch of the motor drive circuit and a rotation direction of the DC motor.

FIG. 2 is a circuit diagram illustrating the motor drive circuit 3 when the control object motor 2 is the DC motor. The motor drive circuit 3 includes four switches TR1 to TR4. For example, each switch is constructed with a transistor or a field effect transistor. In the switches TR1 to TR4, the switches TR1 and TR3 are connected in series between a power supply and a ground. Similarly, the switches TR2 and TR4 are connected in series between the power supply and the ground. A positive-electrode-side terminal of the motor 2 is connected between the switches TR1 and TR3 while a negative-electrode-side terminal of the motor 2 is connected between the switches TR2 and TR4. Switch terminals (for example, correspond to base terminals when the switches TR1 to TR4 are the transistors, or correspond to gate terminals when the switches TR1 to TR4 are the field effect transistors) of the switches TR1 to TR4 are connected to the output circuit 16. The drive signal is input from the DC motor drive signal generation unit 14 to the switch terminals of the switches TR1 to TR4 through the output circuit 16.

FIG. 3 is a view illustrating an example of a table indicating a relationship between the drive signal applied to each switch of the motor drive circuit 3 and a rotation direction of the DC motor.

As illustrated in a table 300, in the case that the DC motor is normally rotated, the drive signal set according to the PWM system is applied to the switch terminals of the switches TR1 and TR4. The drive signal includes a periodic pulse in which the pulse width varies according to the rotation speed of the DC motor. On the other hand, the drive signal is not applied to the switch terminals of the switches TR2 and TR3. Therefore, because a power supply voltage is applied to the positive-electrode-side terminal of the DC motor only when the pulse is applied to the switches TR1 and TR4, the DC motor rotates normally at a speed corresponding to the pulse width.

In the case that the DC motor is normally rotated, the drive signal may be applied to one of the switches TR1 and TR4 while the other is always turned on.

On the other hand, in the case that the DC motor is reversely rotated, the drive signal set according to the PWM system is applied to the switch terminals of the switches TR2 and TR3. The drive signal includes the periodic pulse in which the pulse width varies according to the rotation speed of the DC motor. On the other hand, the drive signal is not applied to the switch terminals of the switches TR1 and TR4. Therefore, because the power supply voltage is applied to the negative-electrode-side terminal of the DC motor only when the pulse is applied to the switches TR2 and TR3, the DC motor rotates reversely at a speed corresponding to the pulse width.

In the case that the DC motor is reversely rotated, the drive signal may be applied to one of the switches TR2 and TR3 while the other is always turned on.

In the case that the DC motor is braked, the switch terminals of the switches TR3 and TR4 are turned on, and the switch terminals of the switches TR1 and TR2 are turned off.

In the case that the DC motor is not driven, the switch terminal of each switch is turned off.

The rotary encoder 4 is an example of a rotation angle sensor. For example, the rotary encoder 4 can be constructed with an optical rotary encoder. The rotary encoder 4 includes a disc, a light source, and a light receiving element. For example, the disc is attached to the rotation shaft of the control object motor 2 (DC motor), and includes plural slits that are circumferentially provided around the rotation shaft. The light source and the light receiving element are arranged so as to face each other across the disc. Every time one of the slits is located between the light source and the light receiving element, light emitted from the light source reaches the light receiving element, whereby the rotary encoder 4 outputs the pulsed detection signal. Therefore, the rotary encoder 4 outputs the detection signal every time the motor 2 rotates by a predetermined angle. For example, when the 50 slits are provided in the disc along the circumferential direction around the rotation shaft of the motor 2, the rotary encoder 4 outputs 50 detection signals while the rotation shaft of the motor rotates once. The rotary encoder 4 may be eliminated in the case that the motor 2 is the stepping motor.

On the other hand, in the case that the control object motor 2 is the stepping motor, the motor control device 1 fixes time per one step (that is, step width) according to the target rotation speed, and the stepping motor drive signal generation unit 15 generates the pulsed drive signal. The pulsed drive signal switches between on and off in each winding of a stator in units of steps. The motor control device 1 outputs the drive signals by the number of steps as much as the target rotation amount to the motor drive circuit 3 through the output circuit 16.

Figure 4A:
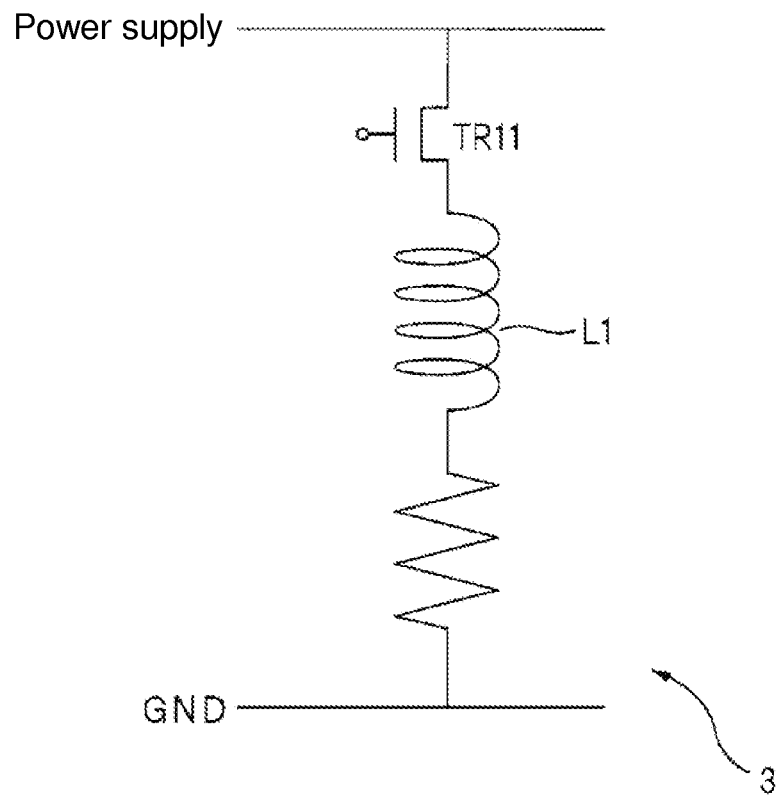
FIG. 4A is a partial circuit diagram illustrating the motor drive circuit when control object motor is a stepping motor.

FIG. 4A is a partial circuit diagram illustrating the motor drive circuit 3 when the control object motor 2 is the stepping motor. The motor drive circuit 3 includes a switch TR11 in each winding (coil) L1 of the stator of the stepping motor. The switch TR11 is located between the power supply and the ground, and is connected in series with the coil L1. For example, the switch TR11 is constructed with a transistor or a field effect transistor. The switch terminal (for example, corresponds to the base terminal when the switch TR11 is the transistor, or corresponds to the gate terminal when the switch TR11 is the field effect transistor) of the switch TR11 is connected to the output circuit 16. The drive signal is input from the stepping motor drive signal generation unit 15 to the switch terminal of the switch TR11 through the output circuit 16.

Figure 4B:
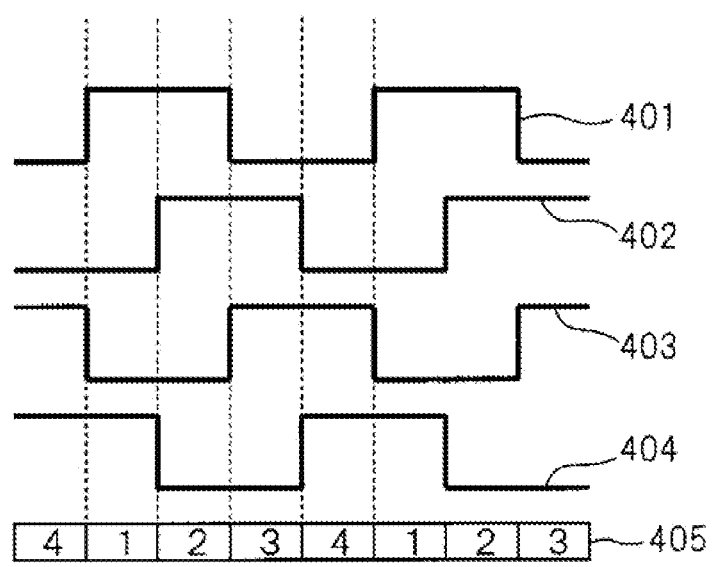
FIG. 4B is a view illustrating an example of the drive signal when the stepping motor is driven by a 2-phase excitation system.

FIG. 4B is a view illustrating an example of the drive signal when the stepping motor is driven by a 2-phase excitation system. In the example of FIG. 4B, four kinds of drive signals 401 to 404 are input to the motor drive circuit 3. As illustrated by a step number 405 illustrated below the drive signals 401 to 404, a combination of on and off of a set of drive signals 401 to 404 is switched in units of steps to rotate the stepping motor in units of steps.

In the case that the control object motor 2 is the stepping motor, no unit may be connected to the sensor interface 17 because the motor control device 1 can obtain the total rotation amount of the motor 2 with no use of the rotation angle sensor.

Each unit of the motor control device 1 will be described below.

In the communication circuit 11, for example, the motor control device 1 is connected to the high-order control device. For example, the high-order control device is a performance CPU of the game machine on which the motor control device 1 is mounted. The communication circuit 11 receives the serially-transmitted control command including plural bits from the high-order control device. The communication circuit 11 may also receive a clock signal, which is synchronized with each of the plural bits included in the control command, from the high-order control device in order to analyze the control command.

The control command includes operation information and setting information. The operation information identifies an operation of the control object motor 2. For example, the operation information includes the target rotation amount of the motor 2, and the target rotation amount of the motor 2 corresponds to a moving amount of a movable body driven by the motor 2. The setting information prescribes a setting of the motor 2. For convenience, a set of the operation information and the setting information with respect to the motor 2 is referred to as a command set. One command set prescribes the operation of the motor.

For example, the clock signal can be constructed with a signal that includes a rectangular pulse in each number of bits in the control command.

Figure 5A:
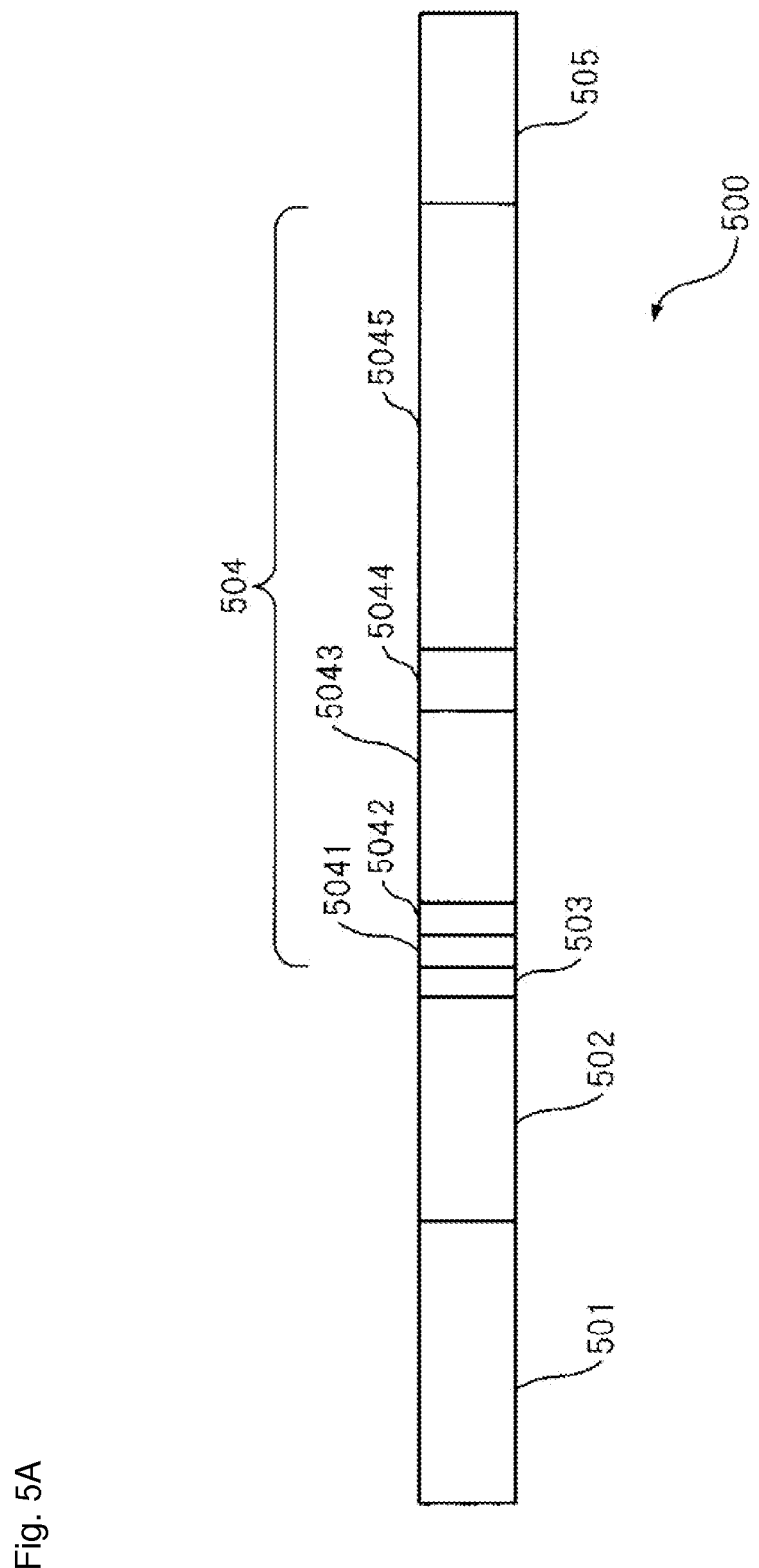
FIG. 5A is a view illustrating an example of a format of a control command including operation information.

FIG. 5A is a view illustrating an example of a format of the control command including the operation information. As illustrated in FIG. 5A, a control command 500 including the operation information includes a start flag 501, a device address 502, an operation/setting switch flag 503, a control data 504, and an end flag 505 in order from a head. The control command 500 may include a 1-bit spacer having a value of, for example, '0' between the flags, addresses, and pieces of data adjacent to each other.

The start flag 501 is a bit string indicating a head of the control command 500. In one or more embodiments of the present invention, the start flag 501 is the bit string in which 9 bits having the value '1' are continued. The start flag 501 may be the bit string that is not matched with any other bit strings in the control command 500.

The device address 502 is identification information identifying the motor control device that is the control object of the control command 500. In one or more embodiments of the present invention, the device address 502 is indicated by a bit string having an 8-bit length. The communication circuit 11 determines whether the device address 502 is matched with an identification address separately received from the high-order control device. A determination that the motor control device 1 is the control object of the control command 500 is made when the device address 502 is matched with the identification address.

The operation/setting switch flag 503 is a 1-bit flag indicating whether the control command includes the operation information or the setting information. In one or more embodiments of the present invention, the control command includes the operation information when the operation/setting switch flag 503 is '0', and the control command includes the setting information when the operation/setting switch flag 503 is '1'. In the example of FIG. 5A, the operation/setting switch flag 503 is '0' because the control command 500 includes the operation information.

The control data 504 includes the operation information on the motor 2 controlled by the motor control device 1. Specifically, the control data 504 includes a motor type identification flag 5041, a rotation direction flag 5042, a speed data 5043, a stopping control mode/magnetic excitation mode flag 5044, and a rotation amount data 5045.

The motor type identification flag 5041 is a 1-bit flag indicating a type of the control object motor 2. In one or more embodiments of the present invention, the motor type identification flag 5041 of '0' indicates that the control object motor 2 is the stepping motor, and the motor type identification flag 5041 of '1' indicates that the control object motor 2 is the DC motor.

The rotation direction flag 5042 is a 1-bit flag indicating the rotation direction of the control object motor 2. In one or more embodiments of the present invention, the motor control device 1 normally rotates the motor 2 for the rotation direction flag 5042 of '0', and the motor control device 1 reversely rotates the motor 2 for the rotation direction flag 5042 of '1'.

The speed data 5043 indicates the target rotation speed of the control object motor 2. In one or more embodiments of the present invention, the speed data 5043 is a bit string having a 4-bit length, and has a value of one of '0' to '15'. The speed data 5043 of '0' indicates that the motor 2 is braked. That is, when the control object motor 2 is the DC motor, the speed data 5043 of '0' indicates that a brake signal turning on the switches TR3 and TR4 of the motor drive circuit 3 is output. On the other hand, when the control object motor 2 is the stepping motor, the speed data 5043 of '0' indicates that the drive signal always turning off the switch is output. The pieces of speed data 5042 of '1' to '15' indicate that the motor 2 is rotated at the target rotation speed obtained from the value of the speed data 5042 and the speed range set by the setting information. In one or more embodiments of the present invention, the target rotation speed is enhanced with increasing value of speed data 5043.

The 2-bit stopping control mode/magnetic excitation mode flag 5044 indicates a stopping control mode designating a stopping system in stopping the motor 2 that tentatively starts the rotation, in the case that the control object motor 2 is the DC motor, namely, in the case that the motor type identification flag 5041 is '1'. When the stopping control mode/magnetic excitation mode flag 5044 is '00', an immediate stopping mode is applied. When the stopping control mode/magnetic excitation mode flag 5044 is '01', an inertia movement mode is applied. When the stopping control mode/magnetic excitation mode flag 5044 is '10', a deceleration control mode is applied. When the stopping control mode/magnetic excitation mode flag 5044 is '11', a stepwise deceleration mode is applied. The detailed stopping control mode is described later.

On the other hand, in the case that the control object motor 2 is the stepping motor, namely, in the case that the motor type identification flag 5041 is '0', the stopping control mode/magnetic excitation mode flag 5044 designates a magnetic excitation mode of the stepping motor. In one or more embodiments of the present invention, when the stopping control mode/magnetic excitation mode flag 5044 is '00', a 1-phase magnetic excitation mode is applied. When the stopping control mode/magnetic excitation mode flag 5044 is '01', a 2-phase magnetic excitation mode is applied. When the stopping control mode/magnetic excitation mode flag 5044 is '10', a 1-2-phase magnetic excitation mode is applied. The motor 2 may be driven according to a magnetic excitation system other than the above magnetic excitation systems.

The rotation amount data 5045 indicates the target rotation amount of the control object motor 2. In one or more embodiments of the present invention, the rotation amount data 5045 is a bit string having a 13-bit length. In the case that the motor 2 is the DC motor, the rotation amount data 5045 indicates the target rotation amount as the number of detection signals received from the rotary encoder 4. That is, a value in which a value indicated by the rotation amount data 5045 is multiplied by a central angle between the adjacent slits of the rotary encoder 4 is the actual target rotation amount of the motor 2.

On the other hand, in the case that the motor 2 is the stepping motor, the rotation amount data 5045 indicates the target rotation amount as the number of steps.

The end flag 505 is a bit string indicating a terminal end of the control command 500. The end flag 505 may be the bit string that is not matched with the start flag and any other bit strings included in the control command 500.

In one or more embodiments of the present invention, the rotation direction flag 5042, the speed data 5043, and the rotation amount data 5045 are prescribed by an identical format regardless of whether the control object motor 2 is the DC motor or the stepping motor. Therefore, the high-order control device can set the rotation direction flag 5042, the speed data 5043, and the rotation amount data 5045 regardless of whether the motor 2 is the DC motor or the stepping motor, so that the development man-hour of the high-order control device can be reduced.

Figure 5B:
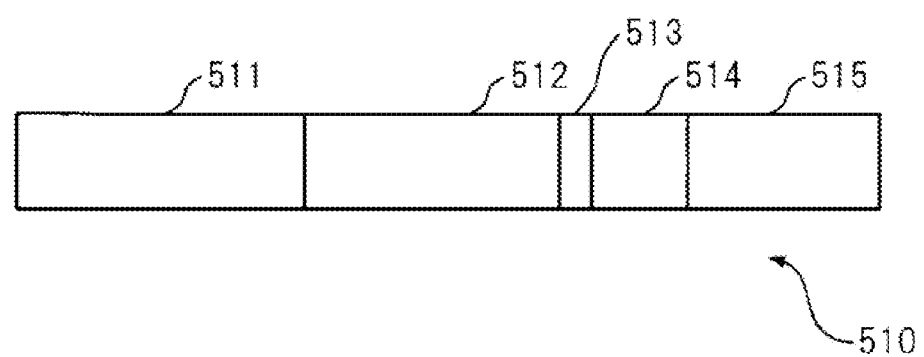
FIG. 5B is a view illustrating an example of the format of the control command including setting information.

FIG. 5B is a view illustrating an example of a format of the control command including the setting information. As illustrated in FIG. 5B, a control command 510 including the setting information includes a start flag 511, a device address 512, an operation/setting switch flag 513, a speed range setting flag 514, and an end flag 515 in the order from the head. The control command 510 including the setting information differs from the control command 500 including the operation information in that the operation/setting switch flag 513 has the value '1' and that the speed range setting flag 514 is included instead of the control data 504. The speed range setting flag 514 will be described below.

The speed range setting flag 514 having a 2-bit length designates an actually-used range as a speed range in a range where the rotation speed of the motor 2 can be set. In the motor control device 1 and the high-order control device, when the speed range is set, the rotation speed can finely be designated by the relatively small number of bits.

In the case that the motor 2 is the DC motor, the rotation speed of the motor 2 also varies by a load torque that depends on a weight of the movable body driven by the motor 2. Therefore, the high-order control device designates the speed range according to the load torque, so that the motor 2 can be rotated at the target rotation speed without changing the value of the speed data.

Figure 6:
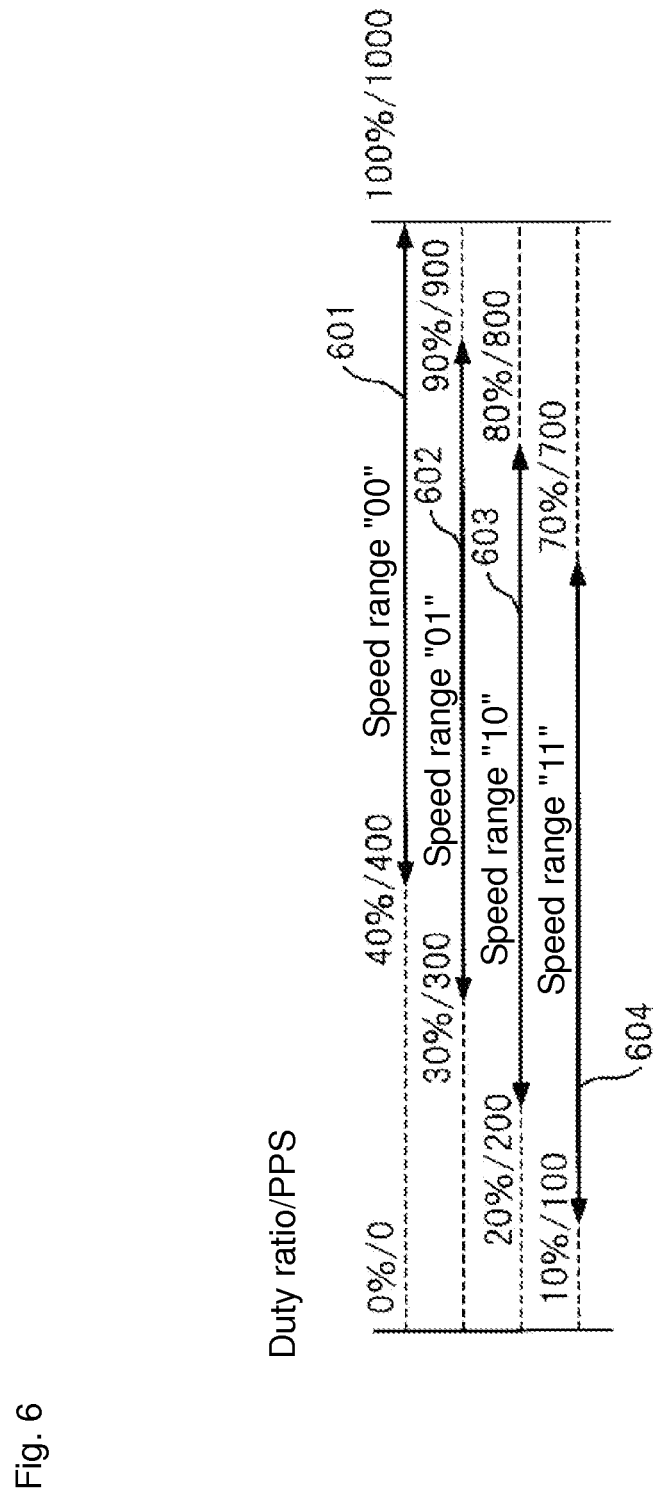
FIG. 6 is a view illustrating an example of a relationship between a value of a speed range setting flag and a speed range.

FIG. 6 is a view illustrating an example of a relationship between a value of the speed range setting flag and the speed range. In one or more embodiments of the present invention, in the case that the control object motor 2 is the DC motor, the rotation speed of the motor 2 is controlled by PWM system. Therefore, the speed range is indicated by the range that the pulse width per period possessed by the drive signal driving the motor 2, namely, a duty ratio can take. In the case that the speed range setting flag has the value '00', the duty ratio of the drive signal is set between 40% to 100% as indicated by an arrow 601. In the case that the speed range setting flag has the value '01', the duty ratio of the drive signal is set between 30% to 90% as indicated by an arrow 602. In the case that the speed range setting flag has the value '10', the duty ratio of the drive signal is set between 20% to 80% as indicated by an arrow 603. In the case that the speed range setting flag has the value '11', the duty ratio of the drive signal is set between 10% to 70% as indicated by an arrow 604.

On the other hand, in the case that the motor 2 is the stepping motor, the number of steps per second varies according to the rotation speed. For example, when the stepping motor can adjust the number of steps per second in the range of 0 pulse/second (pps) to 1000 pps, for example, the ranges of the numbers of steps corresponding to the values of '00', '01', '10', and '11' of the speed range setting flag are set to 400 pps to 1000 pps, 300 pps to 900 pps, 200 pps to 800 pps, and 100 pps to 700 pps, respectively.

The target rotation speed of the motor 2 is set according to the value of the speed data 5043 included in the control data and the speed range designated by the speed range setting flag 514. For example, the designated speed range is equally divided into 15 sections. The values '0001' to '1111' that the speed data 5043 can take correspond to one of the values of which the speed range is equally divided into 15 sections.

The communication circuit 11 receives the identification address from the high-order control device in order to identify the motor control device that is of the control object of the control command. In the case that the identification address is matched with the device address included in the control command, the communication circuit 11 writes the operation information or setting information included in the control command in the register 12. On the other hand, in the case that the identification address is not matched with the device address, the communication circuit 11 discards the received control command.

The communication circuit 11 may include a memory circuit, in which the identification address is stored, in order to be able to determine whether the identification address is matched with the device address even if the identification address differs from the control command in receiving timing.

When one command set stored in the register 12 is performed with respect to the motor 2, namely, when the motor 2 rotates by the target rotation amount included in the command set, the communication circuit 11 outputs a command completion signal indicating the performance of the command set to the high-order control device. For example, the command completion signal can be constructed with a single pulse signal.

The register 12 includes what is called a First-In First-Out (FIFO) memory circuit having a storage capacity in which at least one command set of the motor can be stored. For example, the memory circuit included in the register 12 is constructed with a volatile readable/writeable semiconductor memory circuit.

The command set written by the communication circuit 11 is stored in the register 12. When the command set is read by the control circuit 13, the register 12 erases the command set.

For example, the control circuit 13 includes a processor and a nonvolatile memory circuit. The control circuit 13 fixes the rotation direction of the control object motor 2 by referring to the command set read from the register 12. The control circuit 13 refers to the command set to determine whether the control object motor 2 is the stepping motor or the DC motor.

When the motor 2 is the stepping motor, the control circuit 13 fixes the number of steps per second and a delay amount of the drive signal for each winding of the stator of the stepping motor based on the magnetic excitation mode, rotation direction, and target rotation speed that are designated by the command set. The control circuit 13 notifies the stepping motor drive signal generation unit 15 of the number of steps per second and the delay amount of each drive signal.

The control circuit 13 stores the target rotation amount designated by the control command in the memory circuit as the number of residual steps. The control circuit 13 decrements the number of residual steps by one every time the control circuit 13 receives a notification that the drive signal for one step is output from the stepping motor drive signal generation unit 15. At a time the number of residual steps becomes zero, the control circuit 13 causes the stepping motor drive signal generation unit 15 to stop the output of the pulse signal, and transmits the command completion signal to the high-order control device through the communication circuit 11.

On the other hand, when the motor 2 is the DC motor, the control circuit 13 fixes the duty ratio of the drive signal based on the target rotation speed. The control circuit 13 notifies the DC motor drive signal generation unit 14 of the rotation direction and the duty ratio.

In order to fix the number of steps or the duty ratio, the control circuit 13 identifies a speed table corresponding to the value of the speed range setting flag included in the command set in speed tables that are previously stored in the memory circuit to indicate a correspondence relation among the value of the speed data, the number of steps, and the duty ratio in each speed range. The control circuit 13 refers to the identified speed table to set the number of steps or duty ratio corresponding to the speed data to the number of steps or duty ratio corresponding to the target rotation speed.

FIG. 7 is a view illustrating an example of the speed table in each speed range. Speed tables 701 to 704 corresponds to values '00', '01', '10', and '11' of the speed range setting flag, respectively. In each speed table, the value in each field of a left-side column indicates the speed data, and the value in each field of a central column indicates the number of stepping motor steps per second, and corresponds to the speed data in the field on the left side. The value in each field of a right-side column indicates the duty ratio of the drive signal for the DC motor corresponding to the speed data in the field at a left end in an identical row. For example, when the motor 2 is the stepping motor, when the speed range setting flag has the value '01', and when the speed data is '0111', the control circuit 13 sets the number of steps per second corresponding to the target rotation speed to 600 pps. On the other hand, when the motor 2 is the DC motor, when the speed range setting flag has the value '00', and when the speed data is '0011', the control circuit 13 sets the duty ratio corresponding to the target rotation speed to 55%.

When the motor 2 is the DC motor, the motor control device 1 cannot directly designate the rotation amount of the motor 2. Every time the command set is performed to start the rotation of the motor 2, the control circuit 13 counts the number of detection signals received from the rotary encoder 4, and sets a sum of the received detection signals to the total rotation amount of the motor 2. The control circuit 13 stores the total rotation amount in the memory circuit.

Every time the total rotation amount of the motor 2 is updated, the control circuit 13 calculates a difference between the target rotation amount designated by the rotation amount data included in the command set and the total rotation amount as a residual rotation amount. When the residual rotation amount decreases, the control circuit 13 sets the duty ratio of the drive signal below the duty ratio corresponding to the target rotation speed according to the stopping control mode designated by the stopping control mode flag included in the command set such that the motor 2 stands still at the time the motor 2 rotates by the target rotation amount designated by the control command.

The stopping control mode in the case that the motor 2 is the DC motor will be described with reference to FIGS. 8A to 8D. In FIGS. 8A to 8D, a horizontal axis indicates the total rotation amount of the motor 2. On the other hand, a vertical axis indicates the voltage of the drive signal, ON indicates the voltage at which the current is passed through the motor 2, and OFF indicates the voltage at which the current is not passed through the motor 2.

The stopping control mode of one or more embodiments of the present invention is as follows.

(1) Immediate Stopping Mode

Figure 8A:
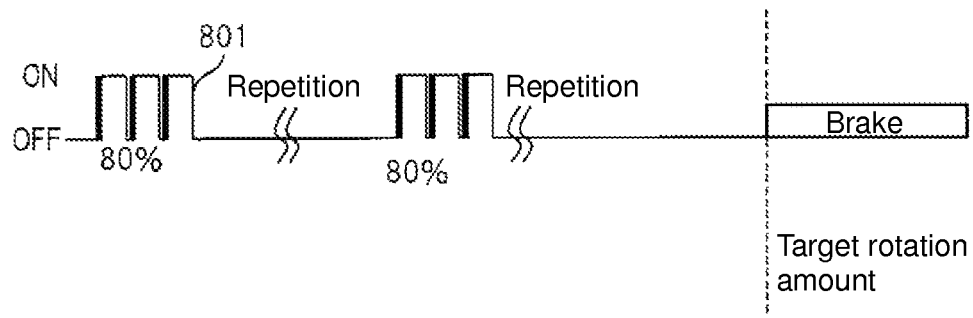
FIG. 8A is a view illustrating an example of a time transition of the drive signal of the DC motor in an immediate stopping mode.

FIG. 8A is a view illustrating an example of a time transition of the drive signal of the motor 2 in the immediate stopping mode. In the immediate stopping mode, the motor control device 1 periodically outputs the pulse signal having the pulse width corresponding to the target rotation speed as a drive signal 801 until the total rotation amount from the starting of the rotation of the motor 2 reaches the target rotation amount. After the total rotation amount reaches the target rotation amount, the drive signal becomes the brake signal turning only on the switches TR3 and TR4 of the motor drive circuit 3. That is, the current is not passed through the motor 2. For example, the immediate stopping mode is used in the case that, at the time the brake signal is output, the motor 2 immediately stands still because of the light-weight movable body driven by the motor 2 and the slow target rotation speed.

(2) Inertia Movement Mode

Figure 8B:
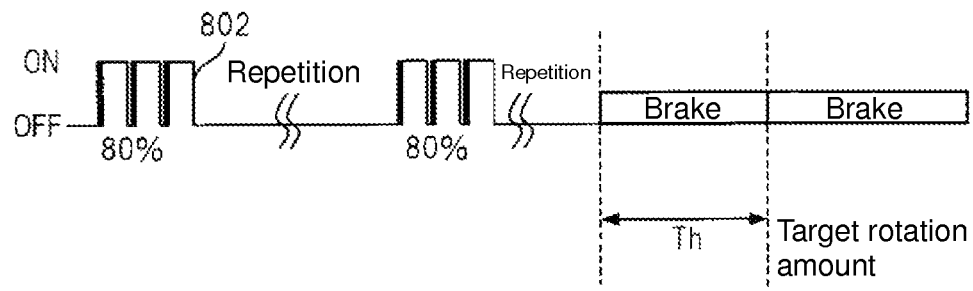
FIG. 8B is a view illustrating an example of the time transition of the drive signal of the DC motor in an inertia movement mode.

FIG. 8B is a view illustrating an example of the time transition of the drive signal of the motor 2 in the inertia movement mode. In the inertia movement mode, the motor control device 1 periodically outputs the pulse signal having the pulse width corresponding to the target rotation speed as a drive signal 802 while the residual rotation amount that is of the difference between the target rotation amount and the total rotation amount is greater than or equal to a predetermined threshold Th (threshold Th>0). At the time the residual rotation amount is less than the threshold Th, the motor control device 1 sets the drive signal 802 to the brake signal. Therefore, the motor control device 1 stops the motor 2 at the time the motor 2 rotates due to inertia by the rotation amount corresponding to the threshold Th after the output of the brake signal, whereby the motor control device 1 controls the motor 2 such that the total rotation amount of the motor 2 becomes the target rotation amount. For example, the inertia movement mode is used in the case that, even if the brake signal is output to the motor 2, the motor 2 rotates by the inertia for a while because of the fast target rotation speed or the heavy movable body driven by the motor 2.

(3) Deceleration Control Mode

Figure 8C:
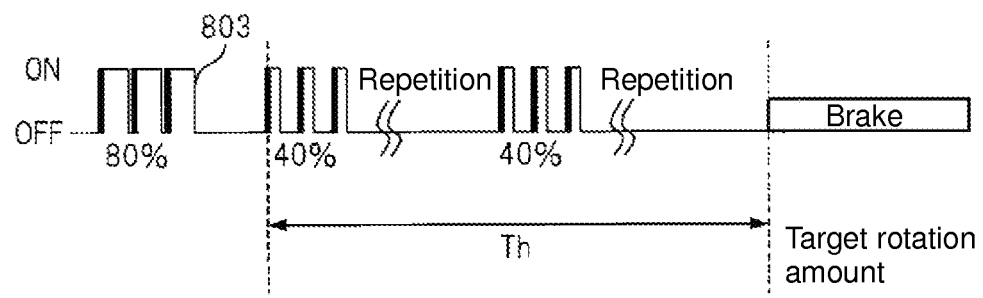
FIG. 8C is a view illustrating an example of the time transition of the drive signal of the DC motor in a deceleration mode.

FIG. 8C is a view illustrating an example of the time transition of the drive signal of the motor 2 in the deceleration control mode. In the deceleration control mode, the motor control device 1 periodically outputs the pulse signal having the pulse width corresponding to the target rotation speed as a drive signal 803 while the residual rotation amount is greater than or equal to the predetermined threshold Th (threshold Th>0). At the time the residual rotation amount is less than the threshold Th, the motor control device 1 narrows the width of each pulse included in the drive signal 803 in order to set the rotation speed of the motor 2 below the target rotation speed. The motor control device 1 lets the motor 2 stand still with the drive signal 803 as the brake signal at the time the motor 2 rotates by the rotation amount corresponding to the threshold Th since the motor 2 starts the deceleration, namely, at the time the total rotation amount of the motor 2 becomes the target rotation amount since the motor 2 starts the deceleration.

(4) Stepwise Deceleration Mode

Figure 8D:
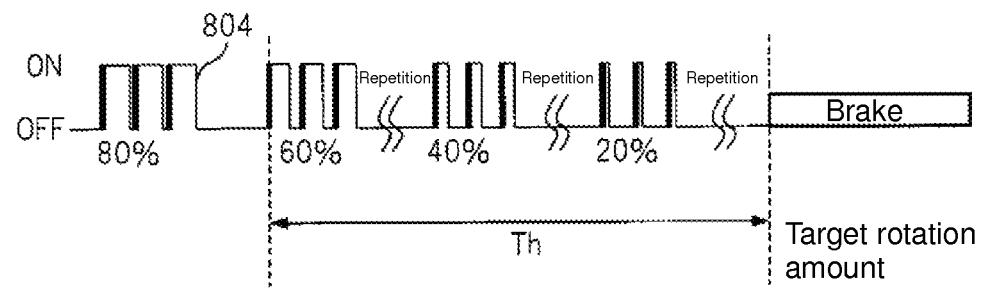
FIG. 8D is a view illustrating an example of the time transition of the drive signal of the DC motor in a stepwise deceleration mode.

FIG. 8D is a view illustrating an example of the time transition of the drive signal of the DC motor in the stepwise deceleration mode. In the stepwise deceleration mode, the motor control device 1 periodically outputs the pulse signal having the pulse width corresponding to the target rotation speed as a drive signal 804 while the residual rotation amount is greater than or equal to the predetermined threshold Th (threshold Th>0). At the time the residual rotation amount is less than the threshold Th, the motor control device 1 narrows the width of each pulse included in the drive signal 804 in order to set the rotation speed of the motor 2 below the target rotation speed. With decreasing residual rotation amount, the motor control device 1 narrows the pulse width to decrease the rotation speed of the motor 2. Finally the motor control device 1 lets the motor 2 stand still with the drive signal 804 as the brake signal at the time the motor 2 rotates by the rotation amount corresponding to the threshold Th since the motor 2 starts the deceleration, namely, at the time the total rotation amount of the motor 2 becomes the target rotation amount since the motor 2 starts the deceleration.

For example, the deceleration control mode and the stepwise deceleration mode are used in the case that, even in the fast target rotation speed or the heavy movable body driven by the motor 2, the motor 2 is controlled such that the total rotation amount of the motor 2 becomes more correctly the target rotation amount compared with the inertia movement mode.

In the case that the motor 2 is the DC motor, these stopping control modes may be selected by a behavior of the movable body, such as a movable accessory of the game machine, which is driven by the motor 2, at the time the motor 2 stops the rotation. For example, when a gear that transmits the rotation of the motor 2 to the movable accessory has much play, the movable accessory exhibits the following behavior in each stopping control mode.

In the case that the immediate stopping mode or the inertia movement mode is applied as the stopping control mode, the sudden stopping of the motor 2 vibrates the movable accessory within the play of the gear. Therefore, the movable accessory is shown to the player of the game machine as if the movable accessory collides with something.

On the other hand, in the case that the deceleration control mode is applied as the stopping control mode, the vibration of the movable accessory is suppressed because a shock is relaxed during the stopping of the motor 2. Therefore, the movable accessory is shown to the player as if the movable accessory stops without the vibration.

In the case that the stepwise deceleration mode is applied as the stopping control mode, the shock is further relaxed during the stopping of the motor 2. Therefore, the movable accessory is shown to the player as if the movable accessory stops smoothly. In this case, because the timing of starting the deceleration of the motor 2 can become earlier, the movable accessory can be shown to the player as if the movable accessory decelerates slowly.

Figure 9:
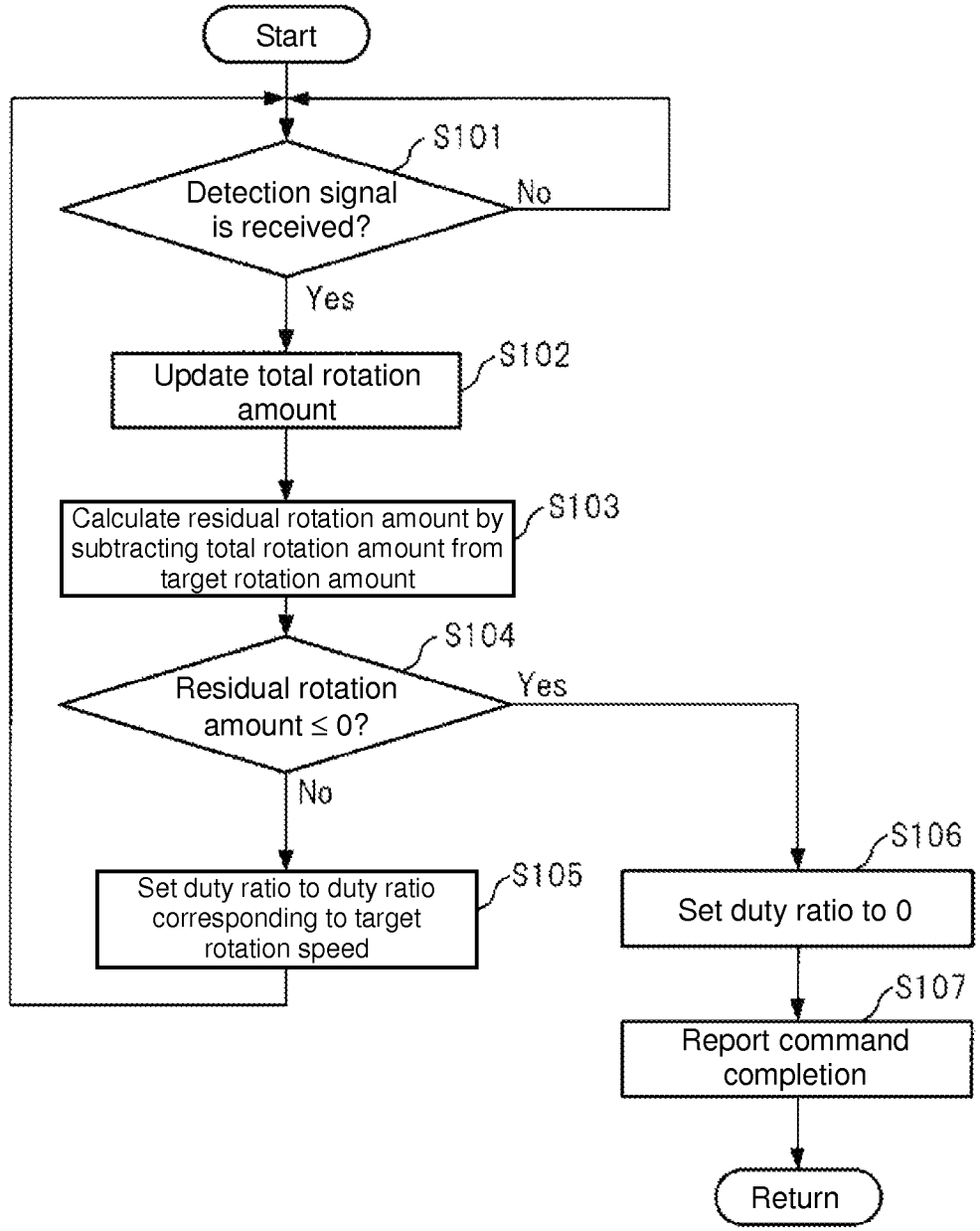
FIG. 9 is a flowchart illustrating stopping control processing when the immediate stopping mode is applied as the stopping control mode.

FIG. 9 is a flowchart illustrating stopping control processing when the immediate stopping mode is applied as the stopping control mode.

The control circuit 13 determines whether the detection signal is received from the rotary encoder 4 through the sensor interface circuit 15 (Step S101).

When the detection signal is not received, the control circuit 13 repeats the processing in Step S101 until the detection signal is received.

On the other hand, when the detection signal is received, namely, when the motor 2 rotates by a rotation angle for one step, the control circuit 13 updates the total rotation amount by adding the rotation angle for one step to the total rotation amount from the starting of the rotation of the motor 2 with respect to the presently-performed command set (Step S102). The control circuit 13 calculates the residual rotation amount by subtracting the total rotation amount from the target rotation amount designated by the command set (Step S103).

When the residual rotation amount is obtained, the control circuit 13 determines whether the residual rotation amount is less than or equal to zero (Step S104).

When the residual rotation amount is greater than zero, namely, when the total rotation amount of the motor 2 does not reach the target rotation amount (No in Step S104), the control circuit 13 sets the duty ratio of the drive signal to the duty ratio corresponding to the target rotation speed (Step S105). The control circuit 13 notifies the DC motor drive signal generation unit 14 of the set duty ratio. The DC motor drive signal generation unit 14 generates the drive signal having the pulse width corresponding to the duty ratio, and outputs the drive signal to the motor drive circuit 3. The control circuit 13 repeats the pieces of processing from Step S101.

On the other hand, when the residual rotation amount is less than or equal to zero, namely, when the total rotation amount of the motor 2 reaches the target rotation amount (Yes in Step S104), the control circuit 13 sets the duty ratio of the drive signal to zero. The control circuit 13 notifies the DC motor drive signal generation unit 14 of the set duty ratio (Step S106). When being notified that the duty ratio is zero, the DC motor drive signal generation unit 14 outputs the brake signal to the motor drive circuit 3.

The control circuit 13 reports command completion by transmitting the command completion signal indicating that the motor 2 rotates by the target rotation amount to the high-order control device through the communication circuit 11 (Step S107). Then the control circuit 13 ends the stopping control processing.

Figure 10:
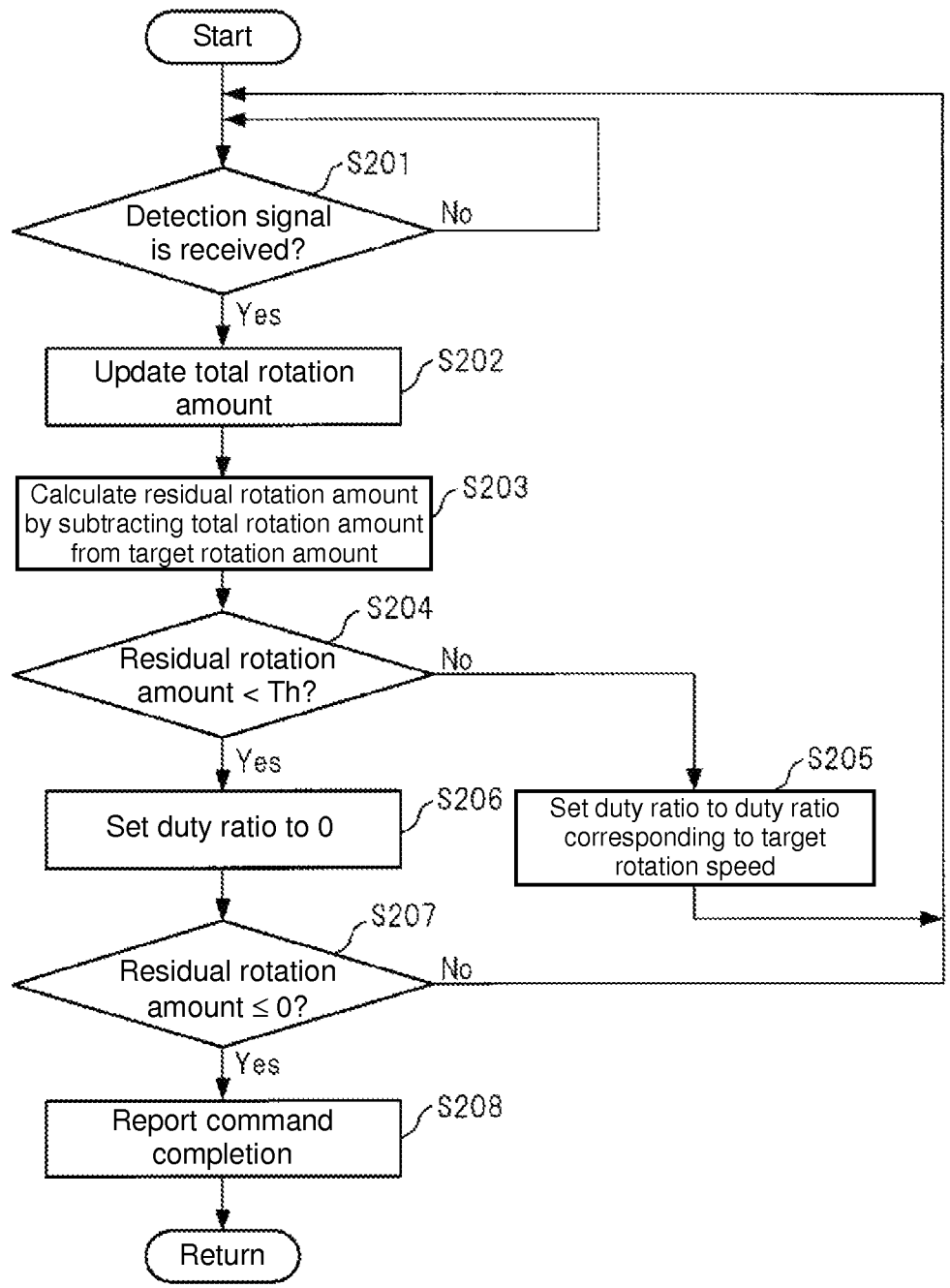
FIG. 10 is a flowchart illustrating the stopping control processing when the inertia movement mode is applied as the stopping control mode.

FIG. 10 is a flowchart illustrating the stopping control processing when the inertia movement mode is applied as the stopping control mode.

Because the pieces of processing in Steps S201 to S203 are identical to those in Steps S101 to S103 of FIG. 9, respectively, the description is omitted.

When the residual rotation amount is obtained in Step S203, the control circuit 13 determines whether the residual rotation amount is less than the threshold Th (Step S204). The threshold Th is a positive value corresponding to the rotation amount until the motor 2 stands still since the motor 2 is braked. The threshold Th may be a predetermined fixed value, or the threshold Th may be set according to the target rotation speed so as to increase with increasing target rotation speed. In this case, for example, a table indicating a relationship between the duty ratio of the drive signal and the threshold Th is previously stored in a memory included in the control circuit 13. The control circuit 13 refers to the table to fix the threshold Th corresponding to the duty ratio of the drive signal.

When the residual rotation amount is greater than or equal to the threshold Th, namely, when the total rotation amount does not reach the target rotation amount even by taking into account the rotation due to inertial motion at the time the motor 2 is immediately braked (No in Step S204), the control circuit 13 sets the duty ratio of the drive signal to the duty ratio corresponding to the target rotation speed (Step S205). The control circuit 13 notifies the DC motor drive signal generation unit 14 of the set duty ratio. The DC motor drive signal generation unit 14 generates the drive signal having the pulse width corresponding to the duty ratio, and outputs the drive signal to the motor drive circuit 3. The control circuit 13 repeats the pieces of processing from Step S201.

On the other hand, when the residual rotation amount is less than the threshold Th (Yes in Step S204), the control circuit 13 sets the duty ratio of the drive signal to zero. The control circuit 13 notifies the DC motor drive signal generation unit 14 of the set duty ratio (Step S206). When being notified that the duty ratio is zero, the DC motor drive signal generation unit 14 outputs the brake signal to the motor drive circuit 3.

After setting the duty ratio of the drive signal to zero, the control circuit 13 determines whether the residual rotation amount is zero (Step S207). When the residual rotation amount is greater than zero (No in Step S207), the control circuit 13 repeats the pieces of processing from Step S201.

On the other hand, when the residual rotation amount is less than or equal to zero (Yes in Step S207), the control circuit 13 reports the command completion by transmitting the command completion signal indicating that the motor 2 rotates by the target rotation amount to the high-order control device through the communication circuit 11 (Step S208). Then the control circuit 13 ends the stopping control processing.

Figure 11:
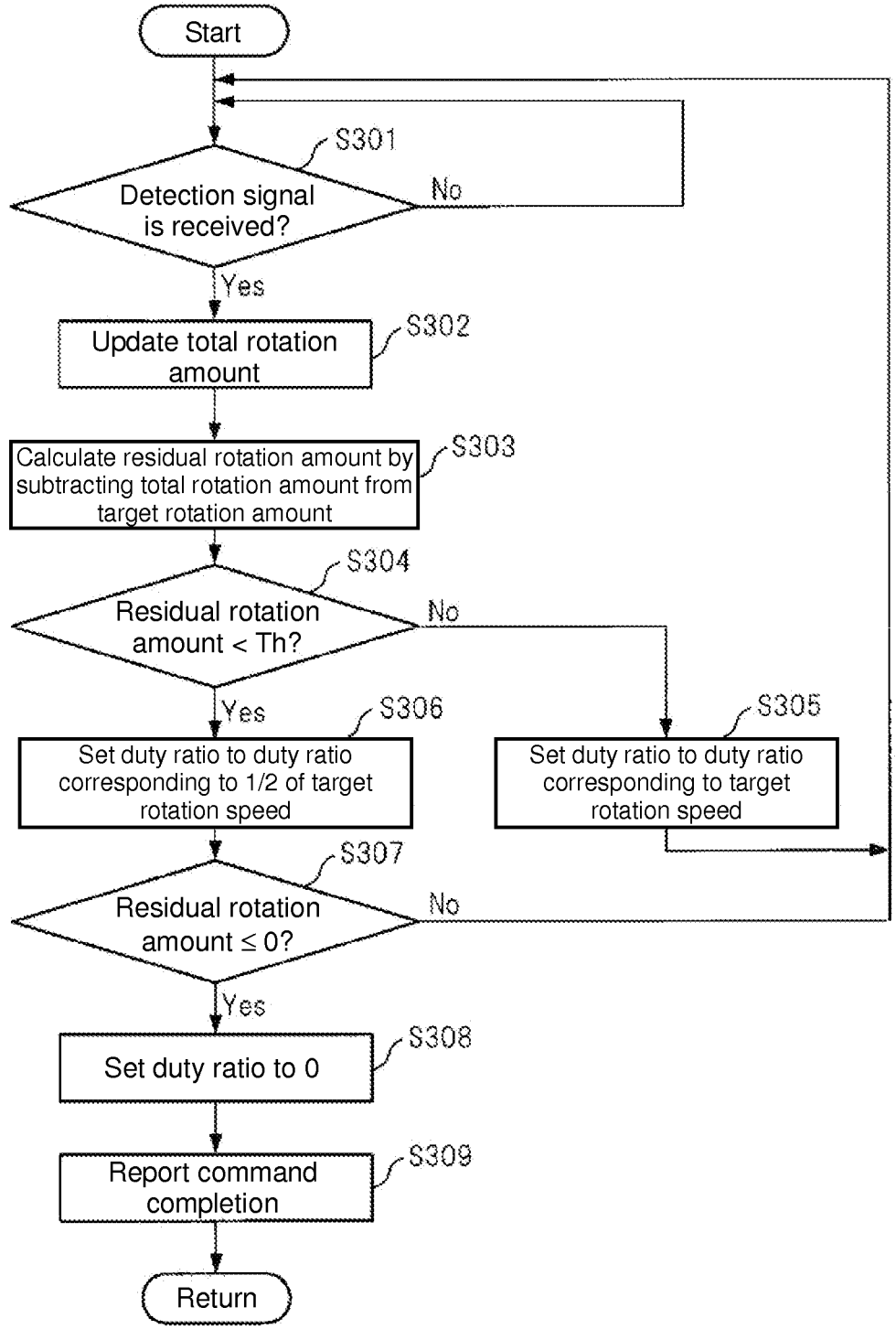
FIG. 11 is a flowchart illustrating the stopping control processing when the deceleration control mode is applied as the stopping control mode.

FIG. 11 is a flowchart illustrating the stopping control processing when the deceleration control mode is applied as the stopping control mode.

Because the pieces of processing in Steps S301 to S303 are identical to those in Steps S101 to S103 of FIG. 9, respectively, the description is omitted.

When the residual rotation amount is obtained in Step S303, the control circuit 13 determines whether the residual rotation amount is less than the threshold Th (Step S304). Similarly to the inertia movement mode, the threshold Th may be a predetermined fixed value, or the threshold Th may be set according to the target rotation speed so as to increase with increasing target rotation speed. At this point, the threshold Th of the residual rotation amount in the deceleration control mode may be equal to or longer than the threshold of the residual rotation amount in the inertia movement mode.

When the residual rotation amount is greater than or equal to the threshold Th (No in Step S304), the control circuit 13 sets the duty ratio of the drive signal to the duty ratio corresponding to the target rotation speed (Step S305). The control circuit 13 notifies the DC motor drive signal generation unit 14 of the set duty ratio. The DC motor drive signal generation unit 14 generates the drive signal having the pulse width corresponding to the duty ratio, and outputs the drive signal to the motor drive circuit 3. The control circuit 13 repeats the pieces of processing from Step S301.

On the other hand, when the residual rotation amount is less than the threshold Th (Yes in Step S304), the control circuit 13 sets the duty ratio of the drive signal to ½ of the duty ratio corresponding to the target rotation speed. The control circuit 13 notifies the DC motor drive signal generation unit 14 of the set duty ratio (Step S306). The DC motor drive signal generation unit 14 generates the drive signal having the pulse width corresponding to the duty ratio, and outputs the drive signal to the motor drive circuit 3.

In Step S306, instead of the duty ratio corresponding to ½ of the target rotation speed, the control circuit 13 may set the duty ratio of the drive signal to the duty ratio (for example, 5% to 10%) corresponding to the rotation speed at which the motor 2 can stop immediately when the brake signal is output. Alternatively, the control circuit 13 may set the post-deceleration duty ratio of the drive signal to an extent in which the motor 2 can decelerate smoothly, for example, the duty ratio corresponding to ⅓, ⅖, ⅗, or ⅔ of the target rotation speed.

After decreasing the duty ratio of the drive signal, the control circuit 13 determines whether the residual rotation amount is less than or equal to zero (Step S307). When the residual rotation amount is greater than zero (No in Step S307), the control circuit 13 repeats the pieces of processing from Step S301.

On the other hand, when the residual rotation amount is less than or equal to zero (Yes in Step S307), the control circuit 13 sets the duty ratio of the drive signal to zero. The control circuit 13 notifies the DC motor drive signal generation unit 14 of the set duty ratio (Step S308). When being notified that the duty ratio is zero, the DC motor drive signal generation unit 14 outputs the brake signal to the motor drive circuit 3. The control circuit 13 reports command completion by transmitting the command completion signal indicating that the motor 2 rotates by the target rotation amount to the high-order control device through the communication circuit 11 (Step S309). Then the control circuit 13 ends the stopping control processing.

Figure 12:
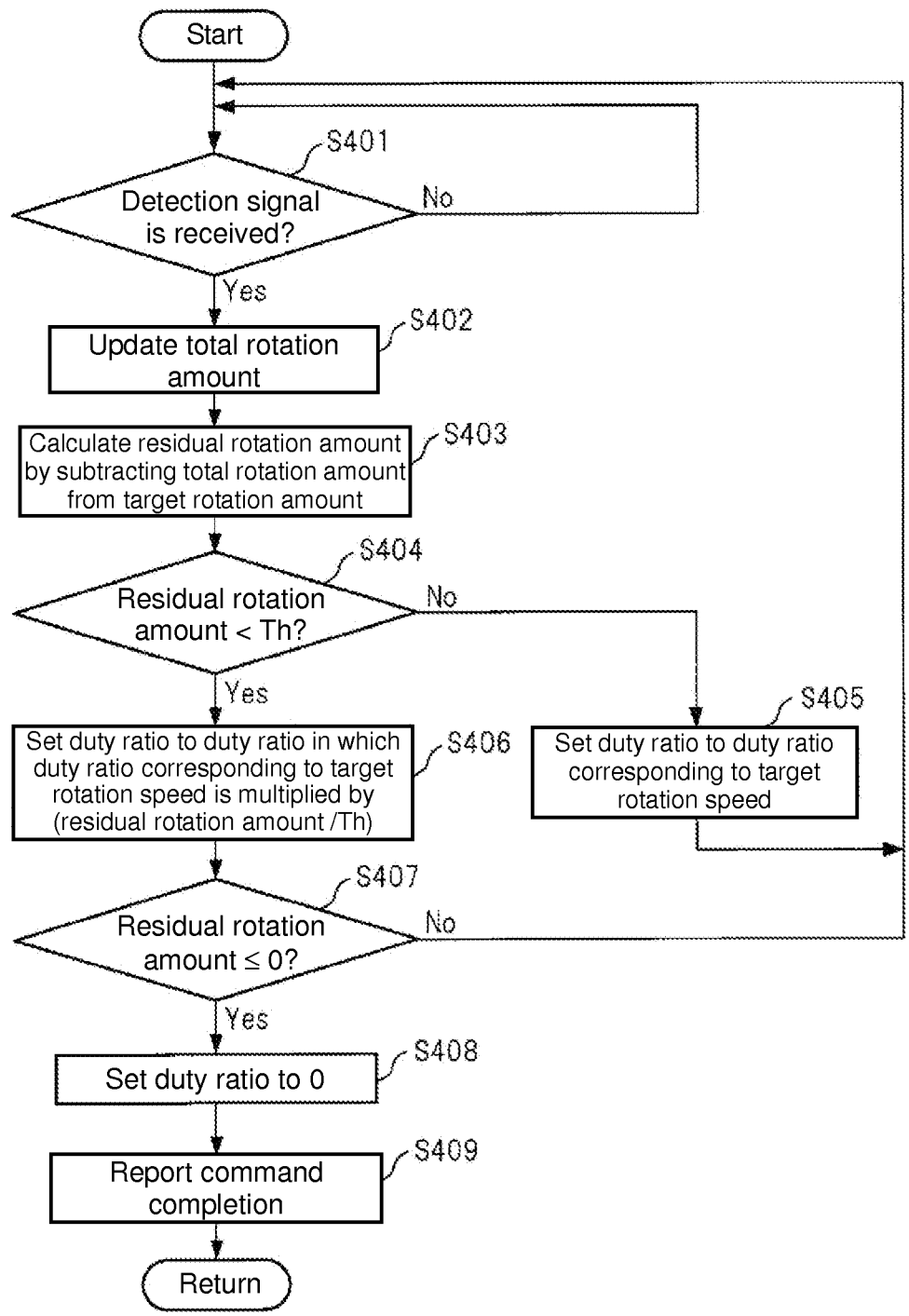
FIG. 12 is a flowchart illustrating the stopping control processing when the stepwise deceleration mode is applied as the stopping control mode.

FIG. 12 is a flowchart illustrating the stopping control processing when the stepwise deceleration mode is applied as the stopping control mode.

A stopping control processing flowchart in FIG. 12 in the application of the stepwise deceleration mode differs from the stopping control processing flowchart in FIG. 11 in the application of the deceleration control mode only in the processing in Step S406, and the pieces of processing in Steps S401 to S405 and Steps S407 to S409 are identical to those in Steps S301 to S305 and Steps S307 to S309, respectively. Therefore, the processing in Step S406 will be described below.

In Step S404, when the residual rotation amount is less than the threshold Th (Yes in Step S404), the control circuit 13 sets the duty ratio of the drive signal to a value in which the duty ratio corresponding to the target rotation speed is multiplied by (residual rotation amount/Th). The control circuit 13 notifies the DC motor drive signal generation unit 14 of the set duty ratio (Step S406). The DC motor drive signal generation unit 14 generates the drive signal having the pulse width corresponding to the duty ratio, and outputs the drive signal to the motor drive circuit 3. Therefore, the motor 2 decelerates with decreasing residual rotation amount.

When the residual rotation amount becomes zero, the control circuit 13 sets the duty ratio of the drive signal to zero, and the DC motor drive signal generation unit 14 outputs the brake signal. Then the control circuit 13 reports the command completion by transmitting the command completion signal to the high-order control device through the communication circuit 11.

For example, the DC motor drive signal generation unit 14 includes a variable pulse generation circuit that can change the width of the output pulse and a switch circuit that switches output of a periodic pulse signal, which is of the drive signal generated by variable pulse generation circuit, to one of switches of the motor drive circuit 3. In the case that the control object motor 2 is the DC motor, the DC motor drive signal generation unit 14 generates the drive signal driving the motor 2 by the PWM system according to the duty ratio of which the control circuit 13 notifies the DC motor drive signal generation unit 14, and the DC motor drive signal generation unit 14 outputs the drive signal to one of the switches of the motor drive circuit 3. For example, one period of the drive signal has a length of 50 μs. For example, in the case that the control circuit 13 notifies the DC motor drive signal generation unit 14 that the rotation direction is the normal rotation, the DC motor drive signal generation unit 14 outputs the periodic pulse signal to the switches TR1 and TR4 of the motor drive circuit 3 through the output circuit 16. On the other hand, in the case that the control circuit 13 notifies the DC motor drive signal generation unit 14 that the rotation direction is the reverse rotation, the DC motor drive signal generation unit 14 outputs the periodic pulse signal to the switches TR2 and TR3 of the motor drive circuit 3 through the output circuit 16.

For example, the stepping motor drive signal generation unit 15 includes the variable pulse generation circuit that can change the width of the output pulse and the pulse period, and a variable delay circuit. In the case that the control object motor 2 is the stepping motor, the stepping motor drive signal generation unit 15 generates the pulse signal in each winding of the stator of the stepping motor as the drive signal using the variable pulse generation circuit. The pulse signal has the pulse width and the pulse period according to the number of steps per second and the excitation system, and the control circuit 13 notifies the stepping motor drive signal generation unit 15 of the number of steps and the excitation system. Using the variable delay circuit, the stepping motor drive signal generation unit 15 delays each drive signal according to the delay amount of which the control circuit 13 notifies the stepping motor drive signal generation unit 15. The stepping motor drive signal generation unit 15 outputs the drive signal corresponding to each winding to the motor drive circuit 3 through the output circuit 16 in units of steps. The stepping motor drive signal generation unit 15 notifies the control circuit 13 that the drive signal for one step is output in each case. The stepping motor drive signal generation unit 15 outputs the signal always turning off the switch while not outputting the pulse signal.

The output circuit 16 includes plural OR circuits, and one of the signals output from the DC motor drive signal generation unit 14 and one of the signals output from the stepping motor drive signal generation unit 15 are input to each OR circuit. An output signal of each OR circuit is output from an output terminal of the output circuit 16.

Therefore, the output circuit 16 outputs the drive signal of the DC motor drive signal generation unit 14 while the DC motor drive signal generation unit 14 outputs the drive signal, and the output circuit 16 outputs the drive signal of the stepping motor drive signal generation unit 15 while the stepping motor drive signal generation unit 15 outputs the drive signal.

The sensor interface circuit 17 includes an interface circuit that receives the detection signal from the rotary encoder 4. In the case that the control object motor 2 is the DC motor, the sensor interface circuit 17 outputs the detection signal to the control circuit 13 every time the sensor interface circuit 17 receives the detection signal.

Figure 13:
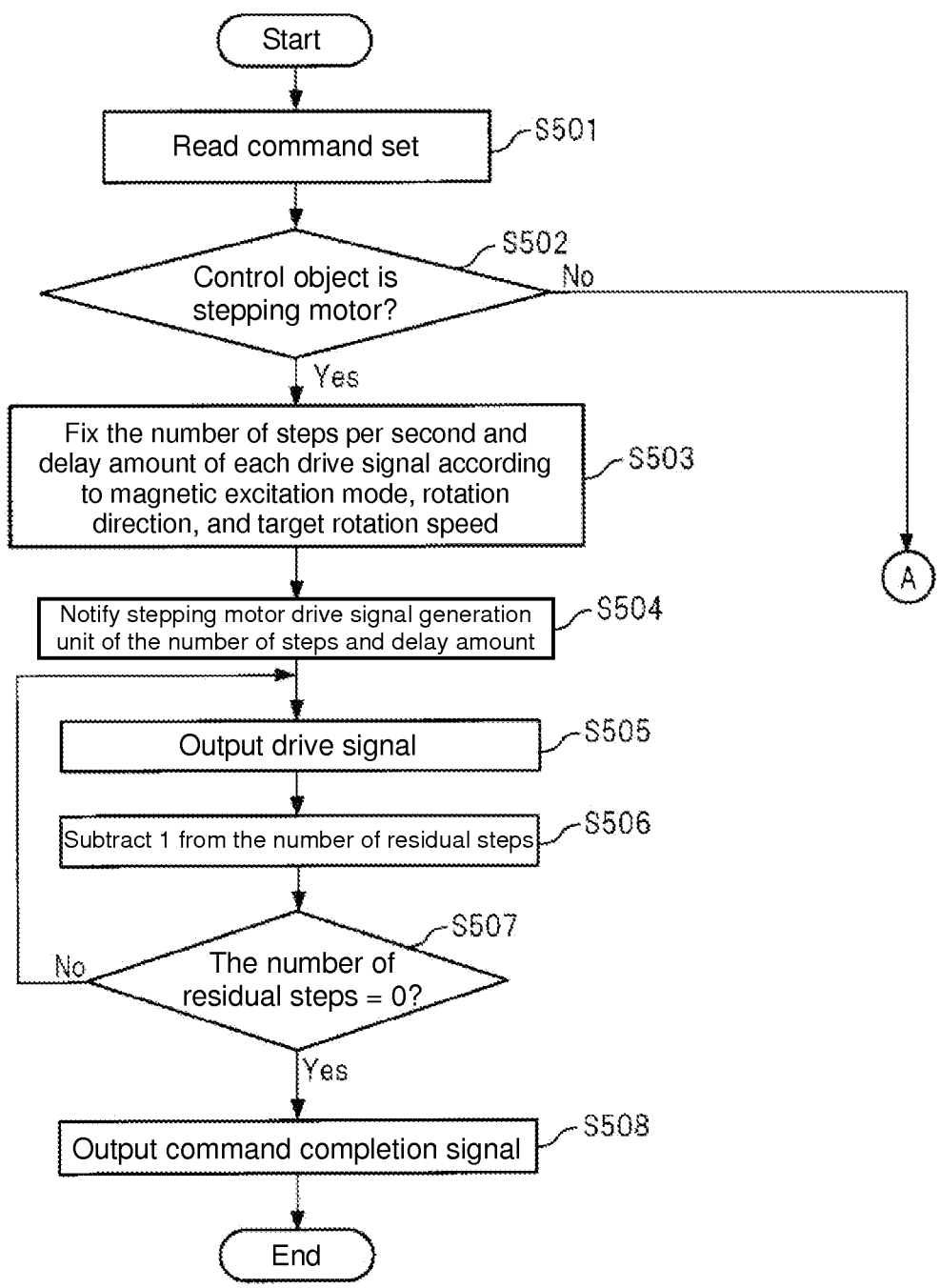
FIG. 13 is a flowchart illustrating motor control processing.
Figure 14:
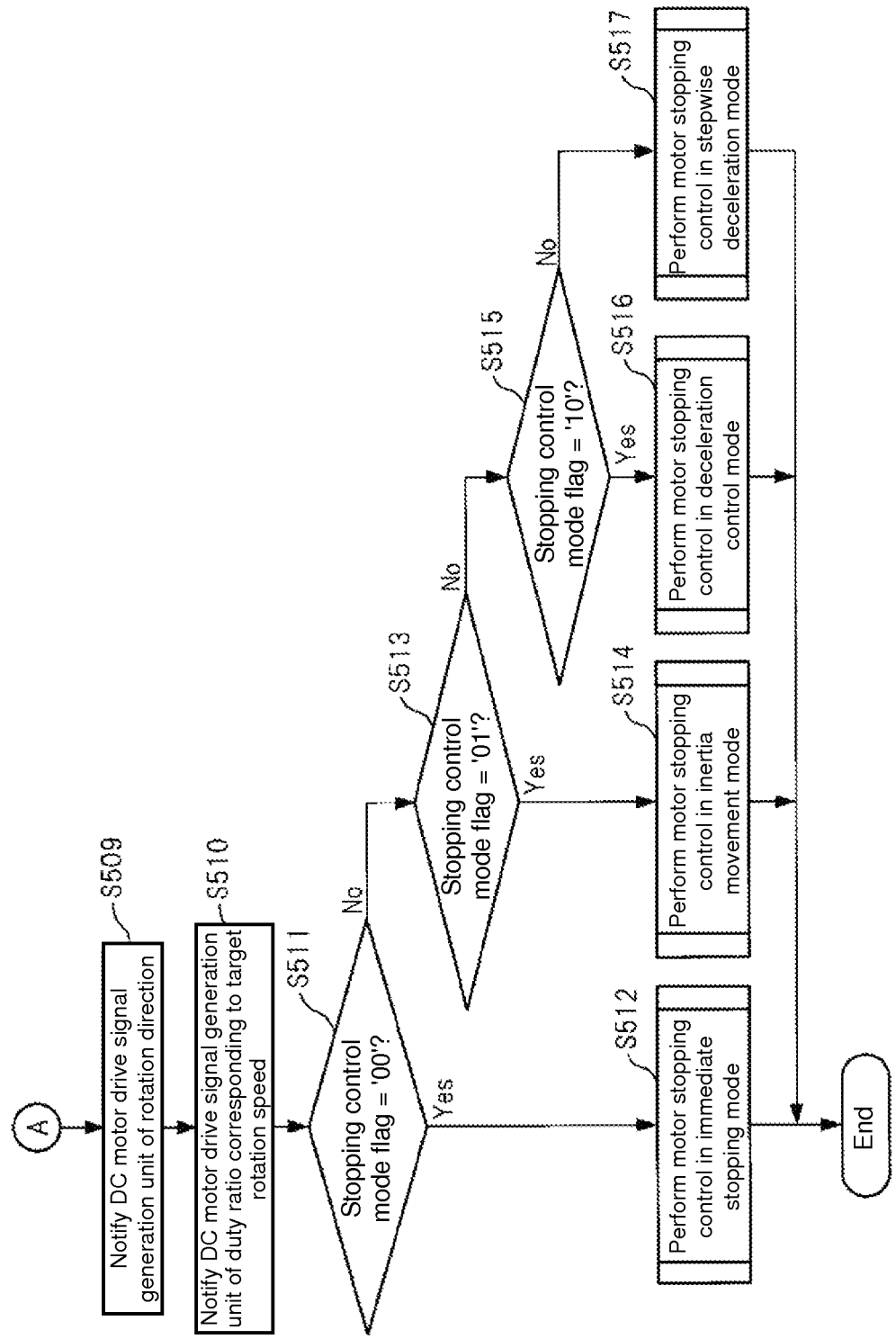
FIG. 14 is a flowchart illustrating the motor control processing.

FIGS. 13 and 14 are flowcharts illustrating motor control processing performed by the motor control device 1. The motor control processing is performed every time the motor control device 1 receives the command set from the high-order control device to store the command set in the register 12.

The control circuit 13 reads the command set stored in the register 12, and erases the command set from the register 12 (Step S501). The control circuit 13 stores the target rotation speed, the target rotation amount, the flag indicating the stopping control mode or the magnetic excitation mode, and the rotation direction that are included in the command set in the memory of the control circuit 13.

The control circuit 13 refers to the motor type identification flag to determine whether the control object motor 2 is the stepping motor (Step S502). When the motor 2 is the stepping motor (Yes in Step S502), the control circuit 13 fixes the number of steps per second and the delay amount of the drive signal for each winding of the stator according to the magnetic excitation mode, the rotation direction, and the target rotation speed (Step S503). The control circuit 13 notifies the stepping motor drive signal generation unit 15 of the number of steps and the delay amount (Step S504).

The stepping motor drive signal generation unit 15 generates each drive signal, and outputs the drive signal to the motor drive circuit 3 through the output circuit 16 (Step S505). The stepping motor drive signal generation unit 15 notifies the control circuit 13 that the drive signal for one step is output in each case. The control circuit 13 decrements the number of residual steps of the stepping motor by one every time the control circuit 13 receives the notification that the drive signal for one step is output from the stepping motor drive signal generation unit 15 (Step S506). An initial value of the number of residual steps is the target rotation amount designated by the control command.

The control circuit 13 determines whether the number of residual steps is zero (Step S507). When the number of residual steps is greater than zero (No in Step S507), the control circuit 13 repeats the pieces of processing from Step S505. On the other hand, when the number of residual steps is zero (Yes in Step S507), the control circuit 13 issues an instruction to the stepping motor drive signal generation unit 15 to stop the output of the drive signal, and transmits the command completion signal to the high-order control device through the communication circuit 11 (Step S508). Then the control circuit 13 ends the motor control processing.

As illustrated in FIG. 14, in Step S502, when determining that the control object motor 2 is the DC motor (No in Step S502), the control circuit 13 refers to the rotation direction flag to fix the rotation direction of the motor 2, and notifies the DC motor drive signal generation unit 14 of the rotation direction (Step S509). The control circuit 13 also notifies the DC motor drive signal generation unit 14 of the duty ratio corresponding to the target rotation speed (Step S510). The DC motor drive signal generation unit 14 generates the drive signal having the pulse width corresponding to the duty ratio, and outputs the drive signal to the motor drive circuit 3 through the output circuit 16. Therefore, the motor 2 starts to rotate.

The control circuit 13 determines the stopping control mode flag has the value '00' (Step S511). When the stopping control mode flag has the value '00' (Yes in Step S511), the control circuit 13 performs the motor stopping control in the immediate stopping mode (Step S512).

On the other hand, when the stopping control mode flag does not have the value '00' (No in Step S511), the control circuit 13 determines whether the stopping control mode flag has the value '01' (Step S513). When the stopping control mode flag has the value '01' (Yes in Step S513), the control circuit 13 performs the motor stopping control in the inertia movement mode (Step S514).

On the other hand, when the stopping control mode flag does not have the value '01' (No in Step S513), the control circuit 13 determines whether the stopping control mode flag has the value '10' (Step S515). When the stopping control mode flag has the value '10' (Yes in Step S515), the control circuit 13 performs the motor stopping control in the deceleration control mode (Step S516). On the other hand, the stopping control mode flag does not have the value '10' (No in Step S515), the control circuit 13 performs the motor stopping control in the stepwise deceleration mode (Step S517).

After Step S512, S514, S516, or S517, the motor control device 1 ends the motor control processing.

As described above, in the motor control device, the control object motor can be controlled by the control command produced by the identical command system regardless of whether the control object motor is the stepping motor or the DC motor. Therefore, in the motor control device, the development man-hour of the high-order control device can be reduced. Additionally, in the case that the DC motor is controlled in the motor control device, the actual rotation amount from the starting of the rotation of the DC motor is obtained using the rotary encoder, and the DC motor is decelerated before the rotation amount actually reaches the target rotation amount. Therefore, in the motor control device, the DC motor can be rotated by the target rotation amount similarly to the stepping motor.

The present invention is not limited to the above embodiments. For example, one control command may include both the operation information and the setting information. According to a first modification, a motor drive device may deal with only one of the plural stopping control modes. In this case, the control command may not include the stopping control mode flag.

According to a second modification, the target rotation speed of the control object motor that is of the DC motor may be designated within a whole range where the rotation speed of the DC motor can be controlled, namely, when the duty ratio of the drive signal ranges from 0% to 100%. Similarly, the target rotation speed of the control object motor that is of the stepping motor may be designated within a whole range where the number of steps per second can be set. In the case that the target rotation speed is designated in the settable whole range with respect to both the DC motor and the stepping motor, the designation of the speed range may be eliminated in the setting information.

According to a third modification, in the case that the control object motor 2 is the DC motor, the control circuit 13 may measure the actual rotation speed of the motor 2 at intervals of the detection signal received from the rotary encoder 4, and automatically switch between the applied speed tables such that the difference between the target rotation speed and the actual rotation speed is decreased. For example, when the actual rotation speed is slower than the target rotation speed, the control circuit 13 may fix the duty ratio of the drive signal while switching the presently-applied speed table to the speed table corresponding to the faster speed range, namely, the speed table in which the higher duty ratio is allocated to the speed data value of the control command. On the other hand, when the actual rotation speed is faster than the target rotation speed, the control circuit 13 may fix the duty ratio of the drive signal while switching the presently-applied speed table to the speed table corresponding to the slower speed range, namely, the speed table in which the lower duty ratio is allocated to the speed data value of the control command.

For example, the control circuit 13 may fix the selected speed range by referring to the following load determination table indicating a relationship among the duty ratio of the drive signal corresponding to the target rotation speed, the actual rotation speed, and the selected speed range, and fix the duty ratio of the drive signal using the speed table corresponding to the speed range.

TABLE 1

Load determination table

| Duty [%] | Detection speed [pps] | Load determination | Speed range |
|---|---|---|---|
| . | . | . | . |
| . | . | . | . |
| . | . | . | . |
| 60-90 | 700- | 3: Excessively light | "11" |
|  | 650-699 | 2: Light | "10" |
|  | 600-649 | 1: Heavy | "01" |
|  | -599 | 0: Excessively heavy | "00" |
| 50-59 | 600- | 3: Excessively light | "11" |
|  | 550-599 | 2: Light | "10" |
|  | 500-549 | 1: Heavy | "01" |
|  | -499 | 0: Excessively heavy | "00" |
| . | . | . | . |
| . | . | . | . |
| . | . | . | . |

According to a fourth modification, the control command may further include an automatic/manual switching flag used to switch between the applied speed range designated by the control command and the speed range fixed by the automatic control. For example, the automatic/manual switching flag may be provided in the control command including the operation information or in the control command including the setting information. In the fourth modification, the control circuit 13 refers to the automatic/manual switching flag. In the case that the automatic/manual switching flag has the value (for example, '1') indicating that the speed range is designated by the control command, the control circuit 13 refers to the speed range setting flag to fix the applied speed table. On the other hand, in the case that the automatic/manual switching flag has the value (for example, '0') indicating the automatic control, the control circuit 13 may fix the initial value of the duty ratio using the speed table designated by the speed range setting flag, and fix the applied speed table by the automatic control after the rotation of the motor 2 is started.

Sometimes the rotation angle per step of the stepping motor differs from the rotation angle (for convenience, referred to as a minimum detection angle) of the DC motor every time the rotary encoder attached to the DC motor outputs the detection signal. Therefore, a ratio R1 of the rotation angle per step of the stepping motor to the reference rotation angle used to fix the target rotation amount and a ratio R2 of the minimum detection angle to the reference rotation angle may be stored in the memory circuit of the control circuit 13. In this case, in the rotation amount data of the control command, the target rotation amount may be expressed by the number of steps in units of reference rotation angles. In the case that the control object motor is the stepping motor, the control circuit 13 calculates the target rotation amount of the stepping motor in units of steps by multiplying the number of steps indicated in the rotation amount data by the ratio R1. In the case that the control object motor is the DC motor, the control circuit 13 calculates the target rotation amount in units of minimum detection angles by multiplying the number of steps indicated in the rotation amount data by the ratio R2. In the fourth modification, the high-order control device can calculate the rotation amount data value of the control command regardless of whether the control object motor is the stepping motor or the DC motor.

For example, according to one or more embodiments of the present invention, the reference rotation angle is set to an angle that is a common factor between the minimum detection angle and the rotation angle per step of the stepping motor. Therefore, the target rotation amount can be described by an integral multiple of the reference rotation angle regardless of whether the motor 2 is the DC motor or the stepping motor.

According to a fifth modification, the DC motor drive signal generation unit 14 and the stepping motor drive signal generation unit 15 may directly output the pulse signal as the drive signal with no use of the output circuit 16. In the fifth modification, one motor control device can simultaneously operate the stepping motor and the DC motor.

The motor control device of one or more embodiments of the present invention and the modifications thereof may be mounted on game machines such as the pachinko game machine and the reel type game machine.

Figure 15:
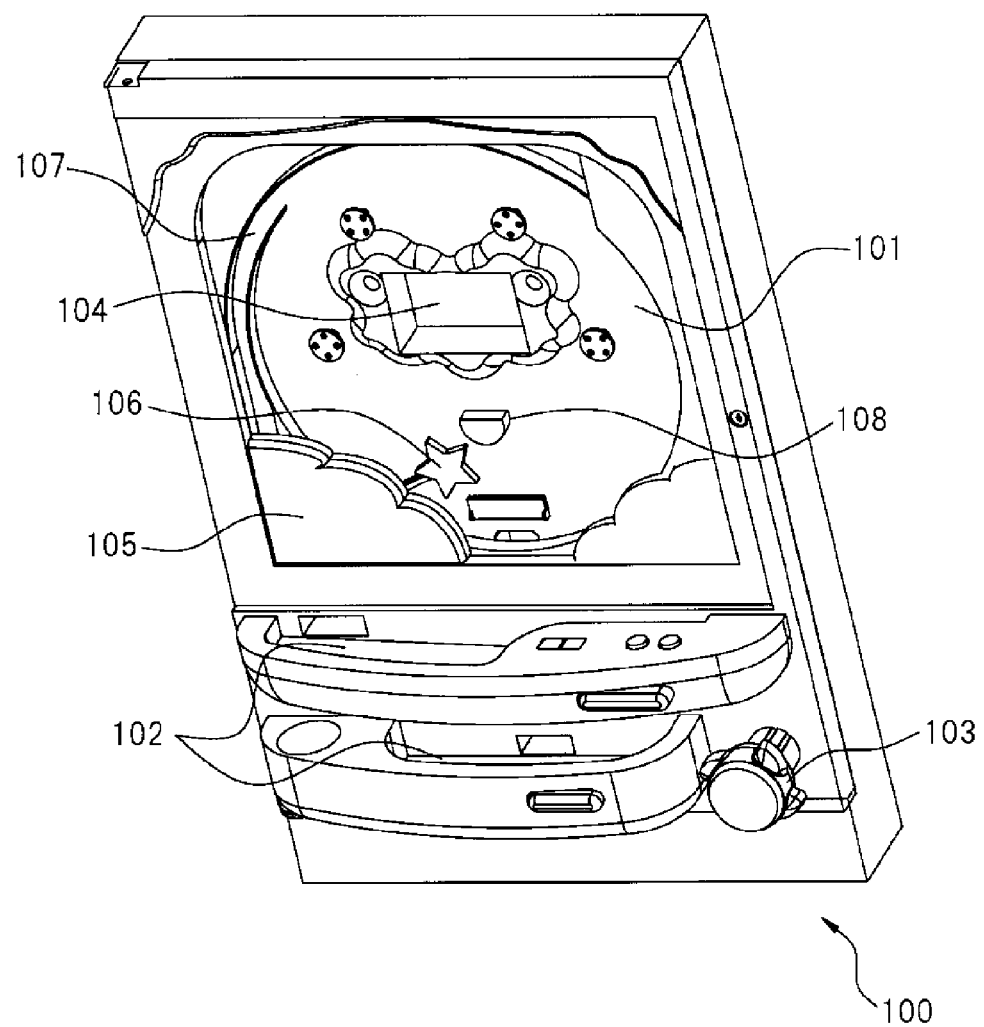
FIG. 15 is a schematic perspective view illustrating a pachinko game machine including the motor control device of one or more embodiments of the present invention.
Figure 16:
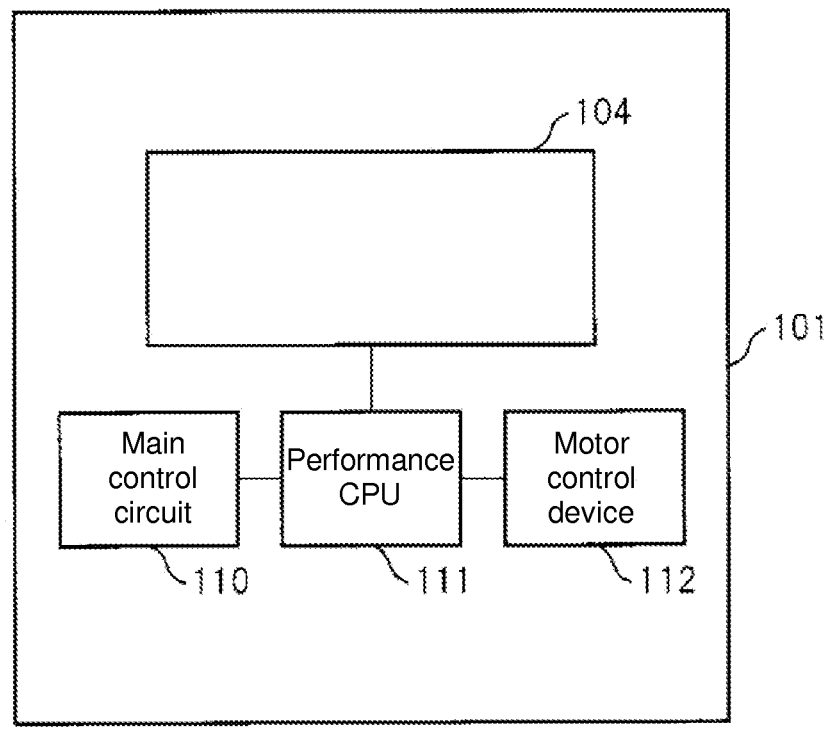
FIG. 16 is a schematic rear view illustrating the pachinko game machine including the motor control device of one or more embodiments of the present invention.

FIG. 15 is a schematic perspective view illustrating a pachinko game machine 100 including the motor control device of one or more embodiments of the present invention or the modification thereof. FIG. 16 is a schematic rear view of the pachinko game machine 100. As illustrated in FIG. 15, the pachinko game machine 100 includes a game board 101 that is of a game machine body provided in a most region from the top to a central portion, a ball receiving unit 102 provided below the game board 101, an operation unit 103 provided with a handgrip, and a display device 104 provided in the substantial center of the game board 101.

For the purpose of the performance of the game, the pachinko game machine 100 includes a fixed accessory unit 105 provided in a lower portion of the game board 101 in the front surface of the game board 101 and a movable accessory unit 106 arranged between the game board 101 and the fixed accessory unit 105. A rail 107 is arranged in a lateral surface of the game board 101. Many obstacle nails (not illustrated) and at least one winning device 108 are provided on the game board 101.

In the operation unit 103, a game ball is launched with a predetermined force from a launching device (not illustrated) according to a turning amount of the handgrip operated by the player. The launched game ball moves upward along the rail 107, and drops among the many obstacle nails. When a sensor (not illustrated) senses that the game ball enters one of the winning devices 108, a main control circuit 110 provided in a rear surface of the game board 101 delivers a predetermined number of game balls to the ball receiving unit 102 through a game ball delivering device (not illustrated) according to the winning device 108 that the game ball enters. The main control circuit 110 causes a display device 104 to display various video images through a performance CPU 111 provided in the rear surface of the game board 101.

Figure 17A:
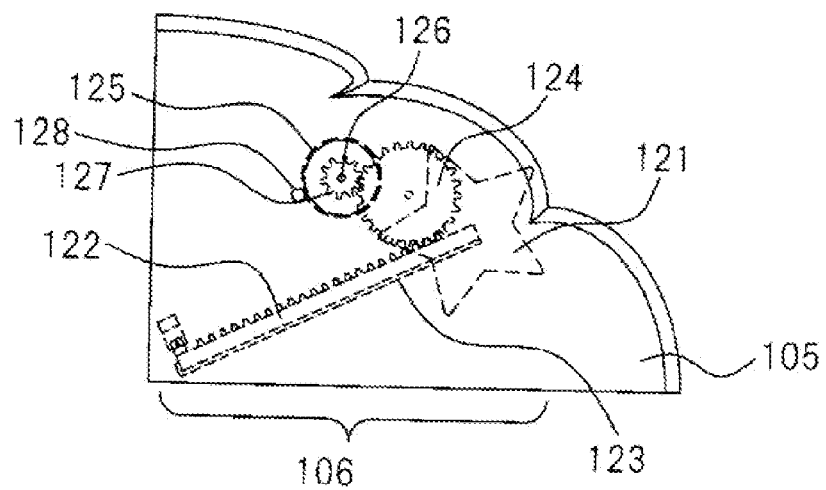
FIG. 17A is a schematic front view illustrating a movable accessory unit through a fixed accessory unit.
Figure 17B:
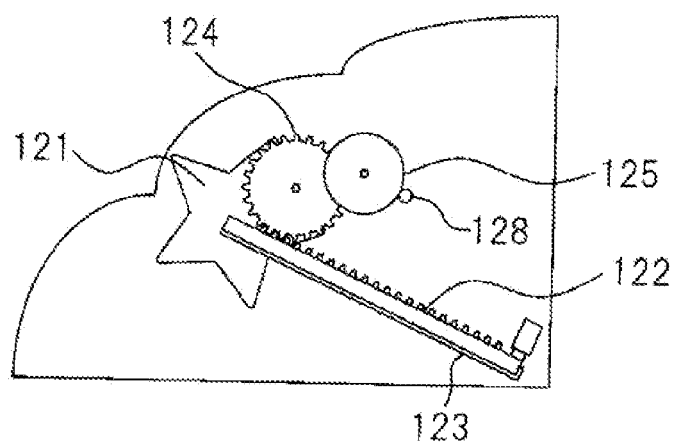
FIG. 17B is a schematic rear view illustrating the case that the movable accessory unit is located at one of ends of a movable range when viewed from a rear surface side of the fixed accessory unit.
Figure 17C:
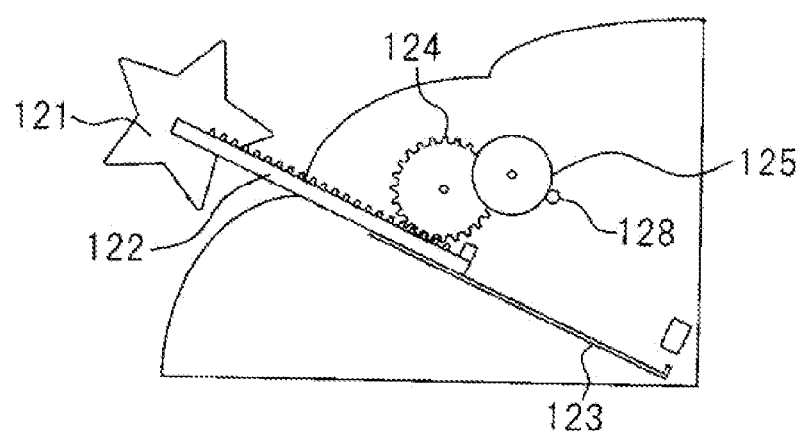
FIG. 17C is a schematic rear view illustrating the case that the movable accessory unit is located at the other end of the movable range when viewed from the rear surface side of the fixed accessory unit.

The movable accessory unit 106 is an example of the movable body that moves according to the game state, and the movable accessory unit 106 is driven by a motor 125 (see FIGS. 17A to 17C). The motor 125 is provided in the rear surface of the game board 101, and controlled by a motor control device 112 according to one or more embodiments of the present invention or the modification thereof. Either the stepping motor or the DC motor may be used as the motor 125. In one or more embodiments of the present invention, the motor 125 is the DC motor.

FIG. 17A is a schematic front view illustrating the movable accessory unit 106 driven by the motor control device 112 through the fixed accessory unit 105, FIG. 17B is a schematic rear view illustrating the case in which the movable accessory unit 106 is located at one of ends of the movable range when viewed from a rear surface side of the fixed accessory unit 105, and FIG. 17C is a schematic rear view illustrating the case in which the movable accessory unit 106 is located at the other end of the movable range when viewed from the rear surface side of the fixed accessory unit 105.

In one or more embodiments of the present invention, the movable accessory unit 106 includes a star-shaped decoration member 121 and a rod-shaped support member 122 that holds the decoration member 121 at one end. The support member 122 engages with a rail 123, and the support member 122 is held so as to be able to move straight along the rail 123. The rail 123 is provided on the rear surface side of the fixed accessory unit 105 so as to be in contact with a lower end of the support member 122 in an oblique direction from a lower left end of the game board 101 toward an upper right. In the example, as illustrated in FIG. 17B, in the case that the movable accessory unit 106 is located in an end portion on the lower left side of the movable range, the decoration member 121 is hidden behind the fixed accessory unit 105 when viewed from the front surface side of the game board 101, and the decoration member 121 cannot be seen from the player. On the other hand, as illustrated in FIG. 16C, in the case that the movable accessory unit 106 is located in an end portion on the upper right side of the movable range, the whole decoration member 121 is located on the central side of the game board 101 relative to the fixed accessory unit 105, and the player can see the whole decoration member 121.

Teeth are formed as a linear gear on the top surface side of the support member 122, and the teeth engage with a reduction gear 124. The reduction gear 124 is placed near the end portion on the lower left end side of the support member 122 in the case that the movable accessory unit 106 is located in the end portion on the upper right side of the movable range. The reduction gear 124 engages with the gear 127 attached to a rotation shaft 126 of the motor 125. Therefore, when the motor 125 rotates by a predetermined angle, the movable accessory unit 106 moves by a predetermined moving amount corresponding to the rotation angle through the gear 127 and the reduction gear 124. The motor 125 is controlled by the motor control device 112.

Based on a state signal indicating the game state transmitted from the main control circuit 110 to the performance CPU 111, the performance CPU 111 fixes a target coordinate of the movable accessory unit 106, and generates the control command according to the fixed target coordinate. The performance CPU 111 outputs the generated control command to the motor control device 112. For example, the performance CPU 111 designates the rotation amount of the motor 125 as the target rotation amount such that the movable accessory unit 106 is hidden behind the fixed accessory unit 105 before the game ball enters the winning device 107. The rotation amount of the motor 125 corresponds to a distance in which the movable accessory unit 106 moves from a present location to the lower left end portion of the movable range. The performance CPU 111 also transmits the control command designating, for example, the deceleration control mode to the motor control device 112. On the other hand, when the state signal indicating that the game ball enters the winning device 107 is input from the main control circuit 110 to the performance CPU 111, the performance CPU 111 designates the rotation amount of the motor 125 as the target rotation amount. The rotation amount of the motor 125 corresponds to the distance in which the movable accessory unit 106 moves from the present location to the upper right end portion of the movable range. The performance CPU 111 also generates the control command designating, for example, the inertia movement mode, and transmits the control command to the motor control device 112. The performance CPU 111 may change the stopping control mode according to a performance state when the movable accessory unit 106 is moved to the upper right end portion of the movable range. For example, in the case that a maximum upsurge is produced, the performance CPU 111 may designate the inertia movement mode such that the movable accessory unit 106 is rapidly stopped to vibrate the movable accessory unit 106 during the stopping. On the other hand, in the case that a temperate upsurge is produced, the performance CPU 111 may designate the stepwise deceleration mode such that the movable accessory unit 106 is slowly stopped.

The motor control device 112 may be the motor control device according to one or more embodiments of the present invention and the modifications thereof, and the motor 125 is controlled such that the motor 125 stands still when rotating by the target rotation amount based on the control command received from the performance CPU 111 and the detection signal received from the rotary encoder 128. Therefore, the movable accessory unit 106 can move correctly to the moving destination according to the performance.

Thus, various changes may be made to the above embodiments without departing from the scope of the present invention. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 motor control device
2 motor
3 motor drive circuit
4 rotary encoder
11 communication circuit
12 register
13 control circuit
14 DC motor drive signal generation unit
15 stepping motor drive signal generation unit 16 output circuit
17 sensor interface circuit
100 pachinko game machine
101 game board
102 ball receiving unit
103 operation unit
104 display device
105 fixed accessory unit
106 movable accessory unit
107 rail
108 winning device
110 main control circuit
111 performance CPU
112 motor control device
121 decoration member
122 support member
123 rail
124 reduction gear
125 motor
126 rotation shaft
127 gear
128 rotary encoder

The invention claimed is:

1. A motor control device comprising:
a communication unit that receives a control command comprising a motor type identification signal and a rotation signal,
wherein the motor type identification signal indicates whether a control object motor is a stepping motor or a DC motor, and
wherein the rotation signal designates a target rotation amount and a target rotation speed of the motor;
a sensor interface that receives a detection signal from a rotation angle sensor when the control object motor is the DC motor,
wherein the rotation angle sensor outputs the detection signal every time the motor rotates by a first rotation angle;
a DC motor drive signal generator configured to generate and output a first drive signal rotating the DC motor at the target rotation speed when the control object motor is the DC motor;
a stepping motor drive signal generator configured to generate and output a second drive signal rotating the stepping motor at the target rotation speed when the control object motor is the stepping motor; and
a controller,
wherein the controller refers to the motor type identification signal to determine whether the control object motor is the stepping motor or the DC motor,
wherein the controller calculates a total rotation amount from rotation starting of the control object motor by a number of receiving times of the detection signal when the control object motor is the DC motor,
wherein the controller causes the DC motor drive signal generator to output the first drive signal so as to let the control object motor stand still when the total rotation amount reaches the target rotation amount, and
wherein the controller causes the stepping motor drive signal generator to output the second drive signal so as to rotate the control object motor by a number of stepping motor steps corresponding to the target rotation amount when the control object motor is the stepping motor.

2. The motor control device according to claim 1,
wherein the target rotation amount is expressed by a number of steps in which a predetermined reference rotation angle is set to one step,
wherein, when the control object motor is the DC motor, the controller multiplies the number of steps indicated by the target rotation amount by a ratio of the first rotation angle to the reference rotation angle to obtain the target rotation amount in units of first rotation angles, and compares the target rotation amount in units of first rotation angles to the total rotation amount to determine whether the control object motor stands still, and
wherein, when the control object motor is the stepping motor, the controller multiplies the number of steps indicated by the target rotation amount by a ratio of a rotation angle per one step of the stepping motor to the reference rotation angle to calculate the number of stepping motor steps corresponding to the target rotation amount.

3. The motor control device according to claim 1,
wherein, when the control object motor is the DC motor, the controller fixes a pulse width by referring to a first table indicating a relationship between the target rotation speed and the pulse width per period, the pulse width being used to control a current supplied to the DC motor by a pulse width modulation system, and causes the DC motor drive signal generator to generate the first drive signal by notifying the DC motor drive signal generator of the pulse width, and
wherein, when the control object motor is the stepping motor, the controller fixes the number of steps of the stepping motor per predetermined duration by referring to a second table indicating a relationship between the target rotation speed and the number of steps of the stepping motor per predetermined time, and causes the stepping motor drive signal generator to generate the second drive signal by notifying the stepping motor drive signal generator of the number of steps.

4. The motor control device according to claim 3,
wherein the control command further comprises a speed range designation signal designating one of partial ranges in a rotation speed range that can be set with respect to the control object motor,
wherein the first table is set in each of the partial ranges, and
wherein, when the control object motor is the DC motor, the controller selects the first table corresponding to the speed range designated by the speed range designation signal, and the pulse width is fixed using the selected first table.

5. The motor control device according to claim 3,
wherein, when the control object motor is the DC motor, the first table is set in each of the plurality of partial ranges different from each other in the rotation speed range that can be set with respect to the control object motor,
wherein the controller measures an actual rotation speed of the control object motor from a time interval of the detection signal received from the rotation angle sensor,
wherein the controller selects one of the plurality of first tables such that a difference between the target rotation speed and the actual rotation speed is decreased, and
wherein the controller fixes the pulse width using the selected first table.

6. The motor control device according to claim 4,
wherein the control command further comprises a speed designation method signal designating whether the first table is selected according to the speed range designation signal, and
wherein, when the control object motor is the DC motor, and when the speed designation method signal indicates that the first table is selected irrespective of the speed range designation signal, the controller measures an actual rotation speed of the control object motor from a time interval of the detection signal received from the rotation angle sensor, selects one of the plurality of first tables such that a difference between the target rotation speed and the actual rotation speed is decreased, and fixes the pulse width using the selected first table.

7. The motor control device according to claim 2,
wherein, when the control object motor is the DC motor, the controller fixes a pulse width by, referring to a first table indicating a relationship between the target rotation speed and the pulse width per period, the pulse width being used to control a current supplied to the DC motor by a pulse width modulation system, and causes the DC motor drive signal generator to generate the first drive signal by notifying the DC motor drive signal generator of the pulse width, and
wherein, when the control object motor is the stepping motor, the controller fixes the number of steps of the stepping motor per predetermined duration by referring to a second table indicating a relationship between the target rotation speed and the number of steps of the stepping motor per predetermined time, and causes the stepping motor drive signal generator to generate the second drive signal by notifying the stepping motor drive signal generator of the number of steps.

8. A game machine comprising:
a game machine body;
a movable body that is movably arranged in a front surface of the game machine body;
a motor that drives the movable body;
a motor control device that controls the motor; and
a performance controller that controls performance according to a game state,
wherein the performance controller generates a control command and transmits the control command to the motor control device,
wherein the control command comprises a motor type identification signal indicating a type of the motor and a rotation signal designating a target rotation amount of the motor corresponding to a moving distance from a present position of the movable body to a moving destination and a target rotation speed of the motor according to the game state, and
wherein the motor control device comprises:
a communication unit that receives the control command;
a sensor interface that receives a detection signal from a rotation angle sensor when the motor is a DC motor, the rotation angle sensor outputting the detection signal every time the motor rotates by a first rotation angle;
a DC motor drive signal generator configured to generate and output a first drive signal rotating the DC motor at the target rotation speed when the motor is the DC motor;
a stepping motor drive signal generator configured to generate and output a second drive signal rotating a stepping motor at the target rotation speed when the motor is the stepping motor; and
a controller,
wherein the controller refers to the motor type identification signal to determine whether the motor is the stepping motor or the DC motor,
wherein the controller calculates a total rotation amount from rotation starting of the motor by the number of receiving times of the detection signal when the motor is the DC motor,
wherein the controller causes the DC motor drive signal generator to output the first drive signal so as to let the motor stand still when the total rotation amount reaches the target rotation amount, and
wherein the controller causes the stepping motor drive signal generator to output the second drive signal so as to rotate the motor by the number of stepping motor steps corresponding to the target rotation amount when the motor is the stepping motor.

* * * * *